(12) United States Patent
Asghari et al.

(10) Patent No.: US 11,467,271 B2
(45) Date of Patent: Oct. 11, 2022

(54) LIDAR SYSTEM WITH SEPARATION OF SIGNALS BY POLARIZATION ANGLE

(71) Applicant: SiLC Technologies, Inc., Monrovia, CA (US)

(72) Inventors: Mehdi Asghari, La Canada Flintridge, CA (US); Bradley Jonathan Luff, La Canada Flintridge, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 389 days.

(21) Appl. No.: 16/726,235

(22) Filed: Dec. 23, 2019

(65) Prior Publication Data

US 2021/0190925 A1 Jun. 24, 2021

(51) Int. Cl.
*G01C 3/08* (2006.01)
*G01S 7/499* (2006.01)
*G01S 17/00* (2020.01)
*G01S 7/481* (2006.01)

(52) U.S. Cl.
CPC .............. *G01S 7/499* (2013.01); *G01S 7/481* (2013.01); *G01S 17/00* (2013.01)

(58) Field of Classification Search
CPC ........... G01S 7/499; G01S 7/481; G01S 17/00
See application file for complete search history.

(56) References Cited

U.S. PATENT DOCUMENTS

| 11,022,683 | B1* | 6/2021 | Rezk ........................ G01S 17/34 |
| 2019/0346568 | A1 | 11/2019 | Asghari et al. |
| 2020/0300980 | A1* | 9/2020 | Behzadi ................ G01S 7/4817 |

OTHER PUBLICATIONS

Baghmisheh, B. B., "Chip-scale Lidar", 2017, University of California, Berkeley.
Issakov, V. "Radar Systems, Ch. 2. In Microwave Circuits for 24GHz Automotive Radar in Silicon-based Technologies", 2010, Berlin Heidelberg: Springer-Verlag.
Li, L., "Time-of-Flight Camera—An Introduction", 2014, TI Technical White Paper SLOA190B.

* cited by examiner

*Primary Examiner* — Mark Hellner
(74) *Attorney, Agent, or Firm* — Gavrilovich, Dodd & Lindsey LLP

(57) ABSTRACT

The LIDAR system includes a polarization component configured such that a first light signal traveling through the polarization component along an optical pathway has its polarization angle changed from a first polarization angle to a second polarization angle. The polarization angle is also configured such that a second light signal traveling the optical pathway in a direction that is the reverse of the direction traveled by the first light signal both enters and exits the polarization component in the second polarization angle. The LIDAR system is configured to output a LIDAR output signal that includes light from the first light signal. The LIDAR system is also configured to receive a LIDAR return signal that includes light from the LIDAR output signal after the LIDAR output signal was reflected by an object located outside of the LIDAR assembly.

19 Claims, 11 Drawing Sheets

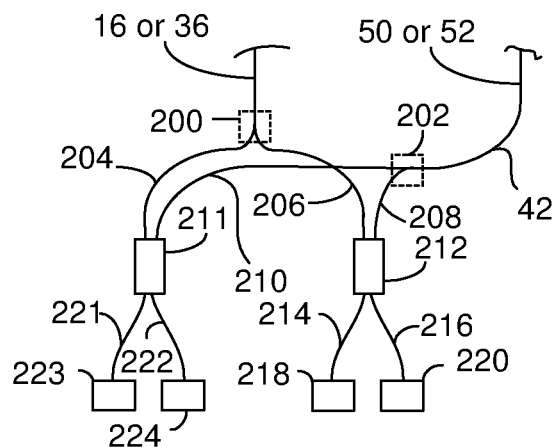
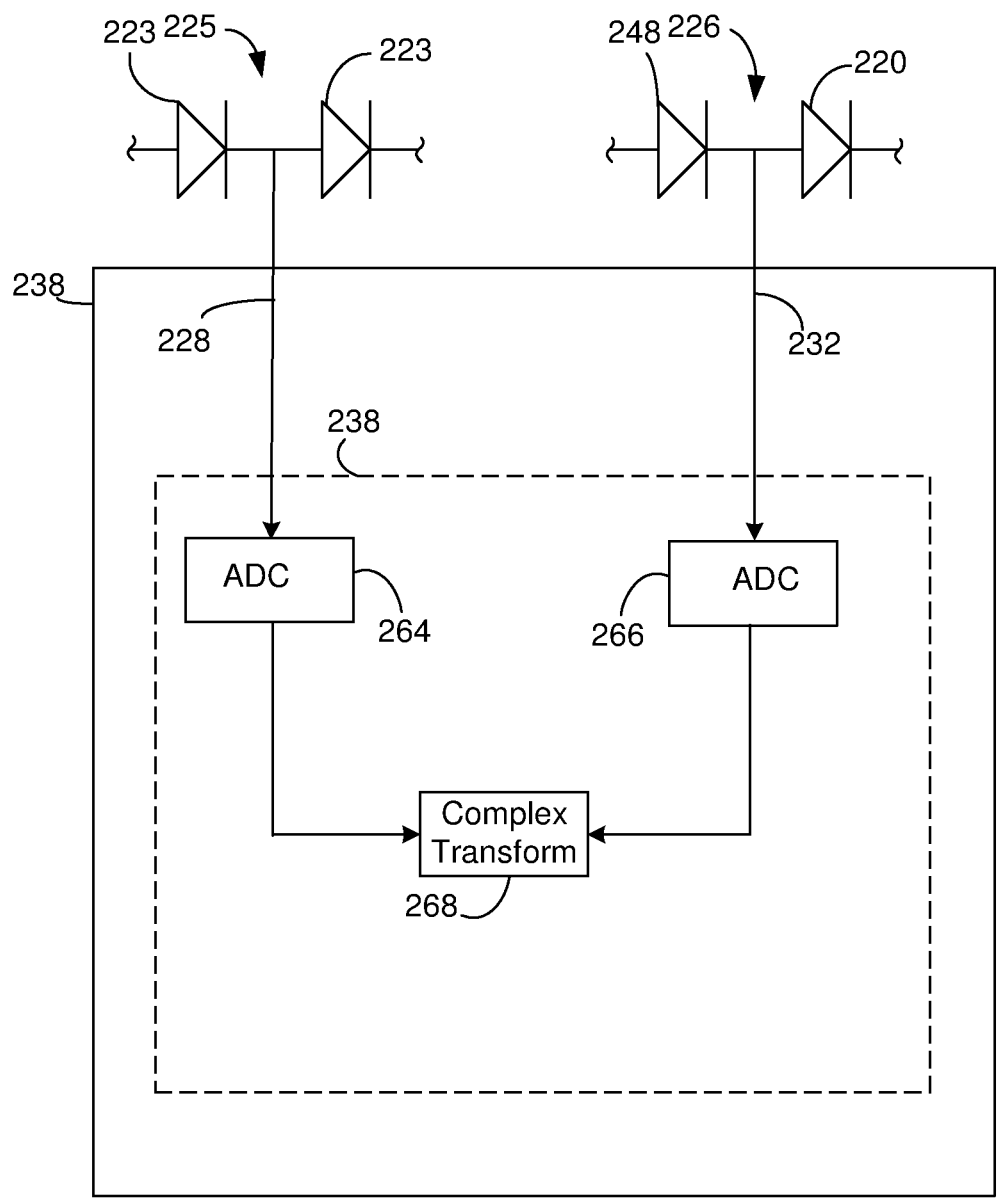
Figure 8A
Figure 8B ually, the LIDAR assembly is configured to output a LIDAR output signal that includes light from the first light signal and to receive a LIDAR return signal that includes light from the LIDAR output signal after the LIDAR output signal is reflected by an object located outside of the LIDAR assembly.

LIDAR SYSTEM WITH SEPARATION OF SIGNALS BY POLARIZATION ANGLE

FIELD

The invention relates to optical devices. In particular, the invention relates to LIDAR assemblies.

BACKGROUND

There is an increasing commercial demand for 3D sensing systems that can be economically deployed in applications such as ADAS (Advanced Driver Assistance Systems) and AR (Augmented Reality). LIDAR (Light Detection and Ranging) systems are used to construct a 3D image of a target scene by illuminating the scene with a LIDAR output signal and measuring the returned signal.

LIDAR systems output a LIDAR output signal that is reflected by an object in the path of the LIDAR output signal. The reflected light can return to the LIDAR system as a LIDAR return signal. Light from the LIDAR return signal is used to generate LIDAR data for the object. Since lasers are often the source the light in the LIDAR output signal, LIDAR output signals are often linearly polarized. Reflection of a polarized signal by an object may change the angle of polarization of all or a portion of the reflected light. Accordingly, a LIDAR return signal can include light of different linear polarization states. LIDAR data carried in the LIDAR return signal can be lost as a result of this change in polarization state. As a result, there is a need for LIDAR systems that can correct for changes in polarization angles caused by reflection of the LIDAR output signal.

SUMMARY

A LIDAR system is configured to output multiple LIDAR output signals that each carries a different channel. The LIDAR system includes a circulator that receives multiple output signals that each carries a different one of the channels. The circulator also receives light from multiple different LIDAR return signals that each carries light from a different one of the LIDAR output signals after the LIDAR output signal has been reflected by an object located outside of the LIDAR system. Each of the different LIDAR return signals includes light carried in multiple different polarization angles and also includes light from a different one of the output signals. The circulator is configured to output multiple first LIDAR input signals that each carries a different one of the channels and multiple second LIDAR input signals that each carries a different one of the channels. The first LIDAR input signal and the second LIDAR input signal that carry the same channel have different distributions of the polarization angles. In some instances, the first LIDAR input signals carry light of a first polarization angle but exclude or substantially exclude light of a second polarization angle and the second LIDAR input signals carry light of the second polarization angle but exclude or substantially exclude light of the second polarization angle.

A LIDAR system includes a polarization component configured such that a first light signal traveling through the polarization component along an optical pathway has its polarization angle changed from a first polarization angle to a second polarization angle. The polarization angle is also configured such that a second light signal traveling the same optical pathway in a direction that is the reverse of the direction traveled by the first light signal both enters and exits the polarization component with the second polarization angle. The LIDAR system is configured to output a LIDAR output signal that includes light from the first light signal. The LIDAR system is also configured to receive a LIDAR return signal that includes light from the LIDAR output signal after the LIDAR output signal was reflected by an object located outside of the LIDAR assembly.

A LIDAR system includes a LIDAR assembly with a polarization component configured to receive a first light signal such that the first light signal travels an optical pathway from a first port of the polarization component to a second port of the polarization component. The polarization component is configured to change a polarization angle of the first light signal as the first light signal travels along the optical pathway. The polarization angle of the first light signal is changed such that the first light signal enters the polarization component at the first port with a first polarization angle and exits the polarization component at the second port with a second polarization angle that is different from the first polarization angle. The polarization component is also configured to receive a second light signal such that the second light signal travels the optical pathway from the second port to the first port. The polarization component is configured to change a polarization angle of the second light signal as the second light signal travels along the optical pathway. The polarization angle of the second light signal is changed such that the second light signal enters the polarization component at the second port with the second polarization angle and exits the polarization component at the first port with the second polarization angle. Additionally, the LIDAR assembly is configured to output a LIDAR output signal that includes light from the first light signal and to receive a LIDAR return signal that includes light from the LIDAR output signal after the LIDAR output signal is reflected by an object located outside of the LIDAR assembly.

BRIEF DESCRIPTION OF THE FIGURES

FIG. 6A illustrates operation of the polarization component on a first light signal and a third light signal.

FIG. 6B illustrates operation of the polarization component shown in FIG. 6A on a second light signal and a fourth light signal.

FIG. 6C and FIG. 6D are each a topview of the same portion of an adapter that includes the circulator. FIG. 6C illustrates the path of an output signal through the circulator.

FIG. 6D illustrates the circulator of FIG. 6C but with a LIDAR return signal traveling through the circulator.

FIG. 8A illustrates an example of a processing unit suitable for use with the LIDAR chip of FIG. 1.

FIG. 8B provides a schematic of electronics that are suitable for use with a processing unit constructed according to FIG. 8A.

DESCRIPTION

The LIDAR system is configured to output a LIDAR output signal. The LIDAR system is also configured to receive a LIDAR return signal that includes light from the LIDAR output signal after the LIDAR output signal is reflected by an object located outside of the LIDAR system. The LIDAR system also includes a circulator with four ports. The circulator allows the LIDAR output signal to exit from the circulator at the same port through which the LIDAR return signal enters the circulator. As a result, the LIDAR output signal and the LIDAR return signal can travel the same path between the object and the LIDAR system. The circulator separates the LIDAR return signal into different signals that each carries light of a different polarization angle. The LIDAR system can process the different signals to determine LIDAR data (distance and/or radial velocity between the reflecting object and the LIDAR chip or LIDAR system) for the object. As a result, the LIDAR data can be generated from light that was carrying different polarization states in the LIDAR return signal. As a result, the use of the circulator in the LIDAR system reduces the loss of LIDAR data from reflection-induced changes in polarization state.

In some instances, the LIDAR system is configured to output multiple LIDAR outputs signals that each carries a different channel. The LIDAR system can include a single circulator that process the light included in multiple different LIDAR output signals and/or in multiple different LIDAR output signals. The ability of light from the LIDAR output signals and/or LIDAR output signals to be processed in a common circulator can reduce the complexity and/or the costs of the LIDAR system.

Figure 1:
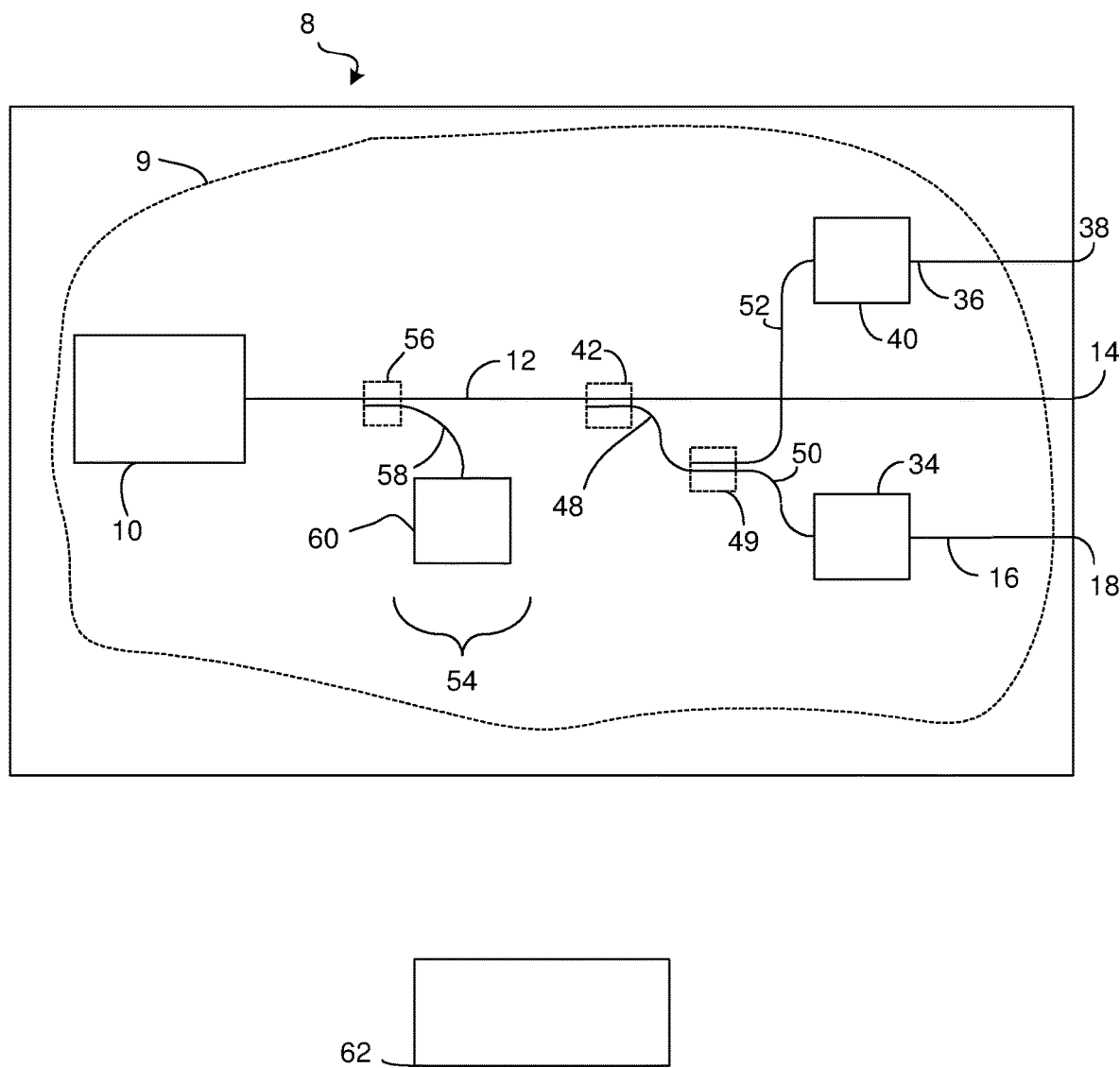
FIG. 1 is a top view of a LIDAR chip that is suitable for use with a LIDAR adapter.

FIG. 1 is a topview of a LIDAR chip 8 that includes chip components 9. The LIDAR chip can include a Photonic Integrated Circuit (PIC) and can be a Photonic Integrated Circuit (PIC) chip. The chip components 9 include a light source 10 that outputs an outgoing LIDAR signal. The outgoing LIDAR signal carries a channel associated with a wavelength. A suitable light source 10 includes, but is not limited to, a laser.

The chip components 9 also include a utility waveguide 12 that receives the outgoing LIDAR signal from the light source 10. The utility waveguide 12 terminates at a facet 14 and carries the outgoing LIDAR signal to the facet 14. The facet 14 can be positioned such that the outgoing LIDAR signal traveling through the facet 14 exits the chip and serves as an output signal. For instance, the facet 14 can be positioned at an edge of the chip so the outgoing LIDAR signal traveling through the facet 14 exits the chip and serves as an output signal.

The LIDAR system can be configured to output a LIDAR output signal that includes, consists of, or consists essentially of light from the output signal. The LIDAR output signal travels away from the chip and may be reflected by objects in the path of the LIDAR output signal. The reflected signal travels away from the objects as a LIDAR return signal. When the LIDAR output signal is reflected, at least a portion of the light from the LIDAR return signal can return to a first input waveguide 16 on the LIDAR chip as a first LIDAR input signal. The first input waveguide 16 includes a facet 18 through which the first LIDAR input signal can enter the input waveguide 16 and serve as a first comparative signal. The first input waveguide 16 carries the first comparative signal to a first processing component 34. At least a portion of the light from the LIDAR return signal can return to a second input waveguide 36 on the LIDAR chip as a second LIDAR input signal. The second input waveguide 36 includes a facet 38 through which the second LIDAR input signal can enter the second input waveguide 36 and serve as a second comparative signal. The second input waveguide 36 carries the second comparative LIDAR signal to a second processing component 40.

The chip components 9 include a splitter 42 configured to move a portion of the outgoing LIDAR signal from the utility waveguide 12 onto a reference waveguide 48 as a reference signal. The LIDAR chip also includes a splitter 49 configured to move a portion of the reference signal carried on the reference waveguide 48 onto a first reference waveguide 50 and another portion of the reference signal onto a second reference waveguide 52. Accordingly, the first reference waveguide 50 carries a first reference signal and the second reference waveguide 52 carries a second reference signal. The first reference waveguide 50 carries the first reference signal to the first processing component 34 and the second reference waveguide 52 carries the second reference signal to the second processing component 40. Suitable splitters 49 include, but are not limited to, optical couplers, y-junctions, and MMIs.

Figure 2:
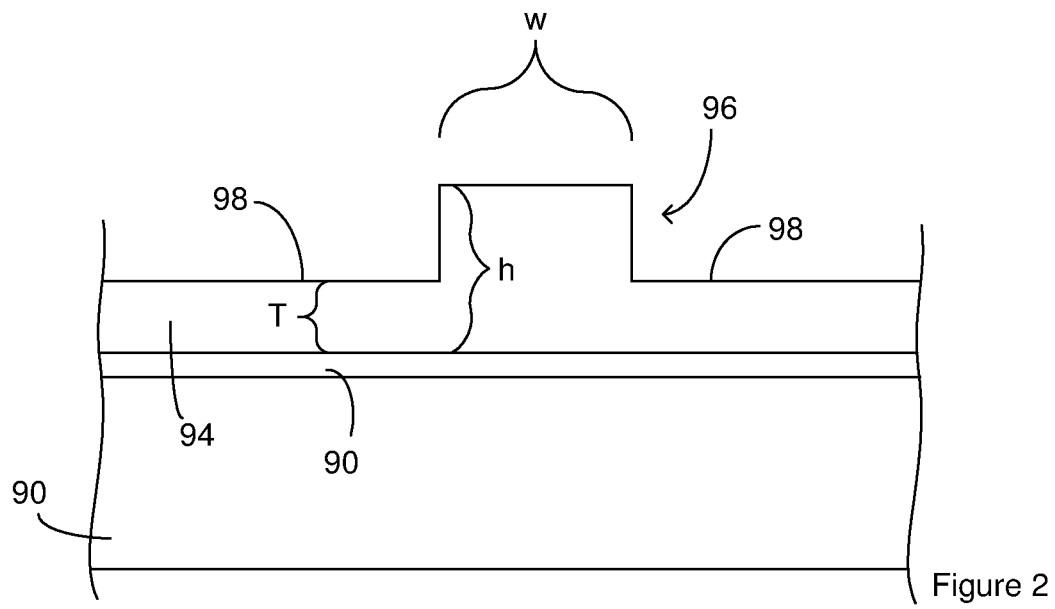
FIG. 2 is a cross-section of a LIDAR chip according to FIG. 1 constructed from a silicon-on-insulator wafer.

The LIDAR chip can include a control branch 54 for controlling operation of the light source 10. The control branch 54 includes a directional coupler 56 that moves a portion of the outgoing LIDAR signal from the utility waveguide 12 onto a control waveguide 58. The coupled portion of the outgoing LIDAR signal serves as a tapped signal. Although FIG. 2 illustrates a directional coupler 56 moving portion of the outgoing LIDAR signal onto the control waveguide 58, other signal-tapping components can be used to move a portion of the outgoing LIDAR signal from the utility waveguide 12 onto the control waveguide 58. Examples of suitable signal tapping components include, but are not limited to, y-junctions, and MMIs.

The control waveguide 58 carries the tapped signal to control components 60. The control components 60 can be in electrical communication with electronics 62. During operation, the electronics 62 can adjust the frequency of the outgoing LIDAR signal in response to output from the control components. An example of a suitable construction of control components is provided in U.S. patent application Ser. No. 15/977,957, filed on 11 May 2018, entitled "Optical Sensor Chip," and incorporated herein in its entirety.

Suitable electronics 62 can include, but are not limited to, a controller that includes or consists of analog electrical circuits, digital electrical circuits, processors, microprocessors, digital signal processors (DSPs), computers, microcomputers, or combinations suitable for performing the operation, monitoring and control functions described above. In some instances, the controller has access to a memory that includes instructions to be executed by the controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

Although the light source 10 is shown as being positioned on the LIDAR chip, all or a portion of the light source 10 can be located off the LIDAR chip.

Suitable platforms for the LIDAR chips include, but are not limited to, silica, indium phosphide, and silicon-on-insulator wafers. FIG. 2 is a cross-section of portion of a chip constructed from a silicon-on-insulator wafer. A silicon-on-insulator (SOI) wafer includes a buried layer 90 between a substrate 92 and a light-transmitting medium 94. In a silicon-on-insulator wafer, the buried layer is silica while the substrate and the light-transmitting medium are silicon. The substrate of an optical platform such as an SOI wafer can serve as the base for the entire chip. For instance, the optical components shown in FIG. 1 can be positioned on or over the top and/or lateral sides of the substrate.

The portion of the chip illustrated in FIG. 2 includes a waveguide construction that is suitable for use with chips constructed from silicon-on-insulator wafers. A ridge 96 of the light-transmitting medium extends away from slab regions 98 of the light-transmitting medium. The light signals are constrained between the top of the ridge and the buried oxide layer.

The dimensions of the ridge waveguide are labeled in FIG. 2. For instance, the ridge has a width labeled w and a height labeled h. A thickness of the slab regions is labeled T. For LIDAR applications, these dimensions can be more important than other dimensions because of the need to use higher levels of optical power than are used in other applications. The ridge width (labeled w) is greater than 1 µm and less than 4 µm, the ridge height (labeled h) is greater than 1 µm and less than 4 µm, the slab region thickness is greater than 0.5 µm and less than 3 µm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 µm and less than 0.5 µm. While the above dimensions will generally provide the straight or substantially straight portions of a waveguide with a single-mode construction, they can result in the tapered section(s) and/or curved section(s) that are multi-mode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction of FIG. 2 is suitable for all or a portion of the waveguides on LIDAR chips constructed according to FIG. 1.

The LIDAR chips can be used in conjunction with a LIDAR adapter. In some instances, the LIDAR adapter can be optically positioned between the LIDAR chip and the one or more reflecting objects and/or the field of view in that an optical path that the output signal travels from the LIDAR chip to the field of view passes through the LIDAR adapter. Additionally, the LIDAR adapter can be configured to operate on the output signal such that the first LIDAR input signal and the LIDAR output signal travel on different optical pathways between the LIDAR adapter and the LIDAR.

Figure 3:
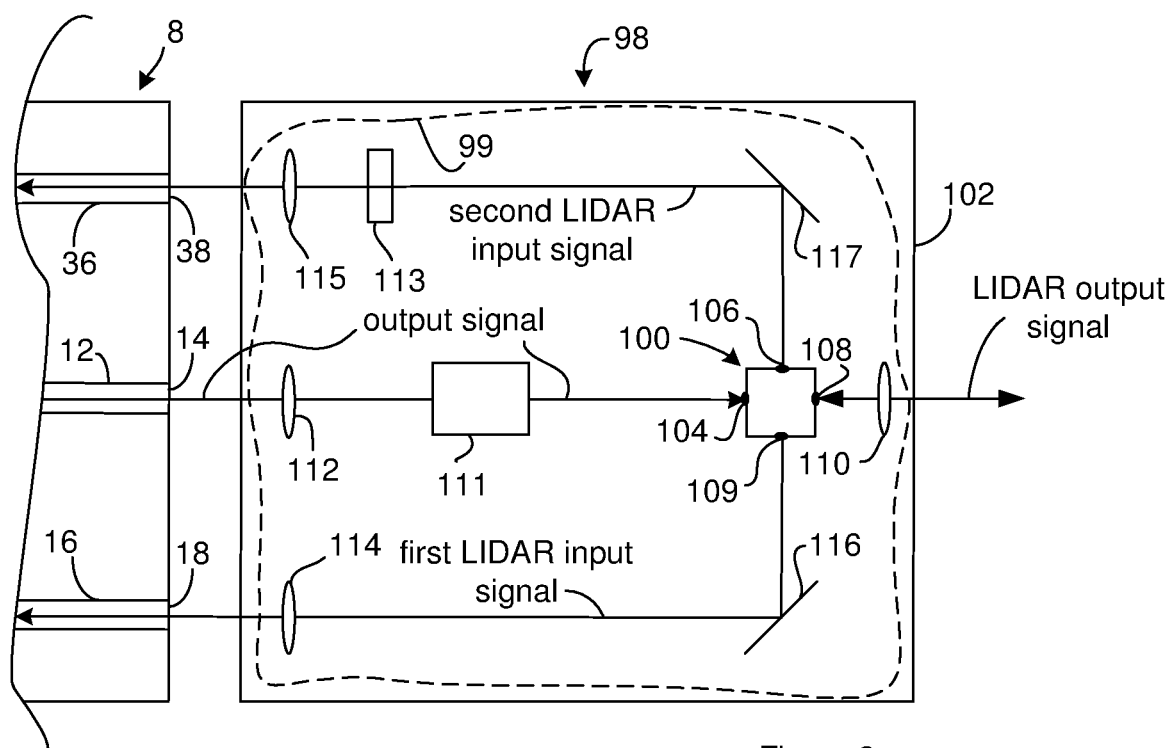
FIG. 3 is a top view of a LIDAR adapter in optical communication with a LIDAR chip.

An example of a LIDAR adapter that is suitable for use with the LIDAR chip of FIG. 1 is illustrated in FIG. 3. The LIDAR adapter 98 includes multiple adapter components 99 positioned on a base. For instance, the LIDAR adapter includes a circulator 100 positioned on a base 102. The illustrated optical circulator includes a first port 104, a second port 106, a third port 108, and a fourth port 109. The output signal enters the first port 104 from the utility waveguide 12 of the LIDAR chip and exits from the third port 108. All or a portion of the output signal that exits from the third port 108 can serve as the LIDAR output signal.

The LIDAR adapter can be configured such that the output of the LIDAR output signal from the third port 108 can also serve as the output of the LIDAR output signal from the LIDAR adapter and/or from the LIDAR system. Alternately, the LIDAR adapter can include other adapter components that process the LIDAR output signal. For instance, the LIDAR adapter can include a collimating device such as a lens 110 positioned so as to provide collimation of the LIDAR output signal.

The LIDAR output signal output from the LIDAR adapter includes, consists of, or consists essentially of light from the output signal received from the LIDAR chip. Accordingly, the LIDAR output signal output from the LIDAR adapter may be the same or substantially the same as the output signal received from the LIDAR chip. However, there may be differences between the LIDAR output signal output from the LIDAR adapter and the LIDAR output signal received from the LIDAR chip. For instance, the LIDAR output signal can experience optical loss as it travels through the LIDAR adapter. As will become evident below, the selection of polarization states in the output signal maybe different from the selection of polarization states in the LIDAR output signal.

An object in the sample region that receives the LIDAR output signal can reflect the LIDAR output signal as a LIDAR return signal. The LIDAR output signals are often linearly polarized in that the light carried by the LIDAR output signal is all of a single polarization angle or is substantially all of a single polarization angle. In some instances, the linear polarization of the LIDAR output signal is a result of use of a laser as the light source 10. Reflection of the LIDAR output signal by an object may change the polarization state of all or a portion of the light in the LIDAR output signal. Accordingly, the LIDAR return signal can include light of different linear polarization states. For instance, the LIDAR return signal can carry light of a first polarization state and light of a second polarization state.

The LIDAR return signal enters the circulator 100 through the third port 108. FIG. 3 illustrates the LIDAR output signal, and the LIDAR return signal traveling between the LIDAR adapter and the sample region along the same optical path. The portion of the LIDAR return signal carrying the light of the first polarization state exits the circulator 100 through the fourth port 109 as a first LIDAR input signal. The first LIDAR input signal is directed to the first input waveguide 16 on the LIDAR chip. Accordingly, the first LIDAR input signal received by the first input waveguide 16 includes or consists of light from the LIDAR output signal and includes light from the LIDAR return signal that was in the first polarization state and excludes or substantially excludes light from the LIDAR return signal that was in the second polarization state. The portion of the LIDAR return signal carrying the light of the second polarization state exits the circulator 100 through the second port 106 as a second LIDAR input signal. The second LIDAR input signal exits the circulator 100 through the second port 106 and is directed to the second input waveguide 36 on the LIDAR chip. Accordingly, the second LIDAR input signal received by the second input waveguide 36 includes or consists of light from the LIDAR output signal and includes light from the LIDAR return signal that was in the second polarization state and excludes or substantially excludes light from the LIDAR return signal that was in the first polarization state.

As is evident from FIG. 3, the LIDAR adapter can include adapter components in addition to the circulator 100. For instance, the LIDAR adapter can include adapter components for directing and controlling the optical path of the output signal, the LIDAR output signal, the first LIDAR input signal, and the second LIDAR input signal. As an example, the adapter of FIG. 3 includes an optional amplifier 111 positioned so as to receive and amplify the output signal before the output signal enters the circulator 100. The amplifier 111 can be operated by the electronics 62 allowing the electronics 62 to control the power of the LIDAR output signal.

FIG. 3 also illustrates the LIDAR adapter including an optional first lens 112, an optional polarization rotator 113, an optional second lens 114, and an optional second lens 115. The first lens 112 can be configured to couple the output signal to a desired location. In some instances, the first lens 112 is configured to focus or collimate the output signal at a desired location. In one example, the first lens 112 is configured to couple the output signal on the first port 104 when the LIDAR adapter does not include an amplifier 110. As another example, when the LIDAR adapter includes an amplifier 110, the first lens 112 can be configured to couple the output signal on the entry port to the amplifier 110.

One or more polarization rotator(s) 113 can optionally be used to rotate the first LIDAR input signal and/or the second LIDAR input signal to a polarization state that is preferred for processing by the LIDAR chip. For instance, one or more polarization rotator(s) 113 can be used to rotate the first LIDAR input signal and/or the second LIDAR input signal to the polarization state of a reference signal with which light from the first LIDAR input signal and/or the second LIDAR input signal will be combined to form a composite signal as described below.

The second lens 114 can be configured to couple the first LIDAR input signal at a desired location. For instance, the second lens 114 can be configured to couple the first LIDAR input signal on the facet 18 of the first input waveguide 16. The third lens 115 can be configured to couple the second LIDAR input signal at a desired location. For instance, the third lens 115 can be configured to couple the second LIDAR input signal on the facet 38 of the second input waveguide 36.

The LIDAR adapter can also include one or more direction changing components such as mirrors. FIG. 3 illustrates the LIDAR adapter including a first mirror as a direction-changing component 116 that redirects the first LIDAR input signal from the circulator 100 to the facet 18 of the input waveguide 16. The LIDAR adapter also includes a second mirror as a direction-changing component 117 that redirects the first LIDAR input signal from the circulator 100 to the facet 38 of the second input waveguide 36.

Figure 4:
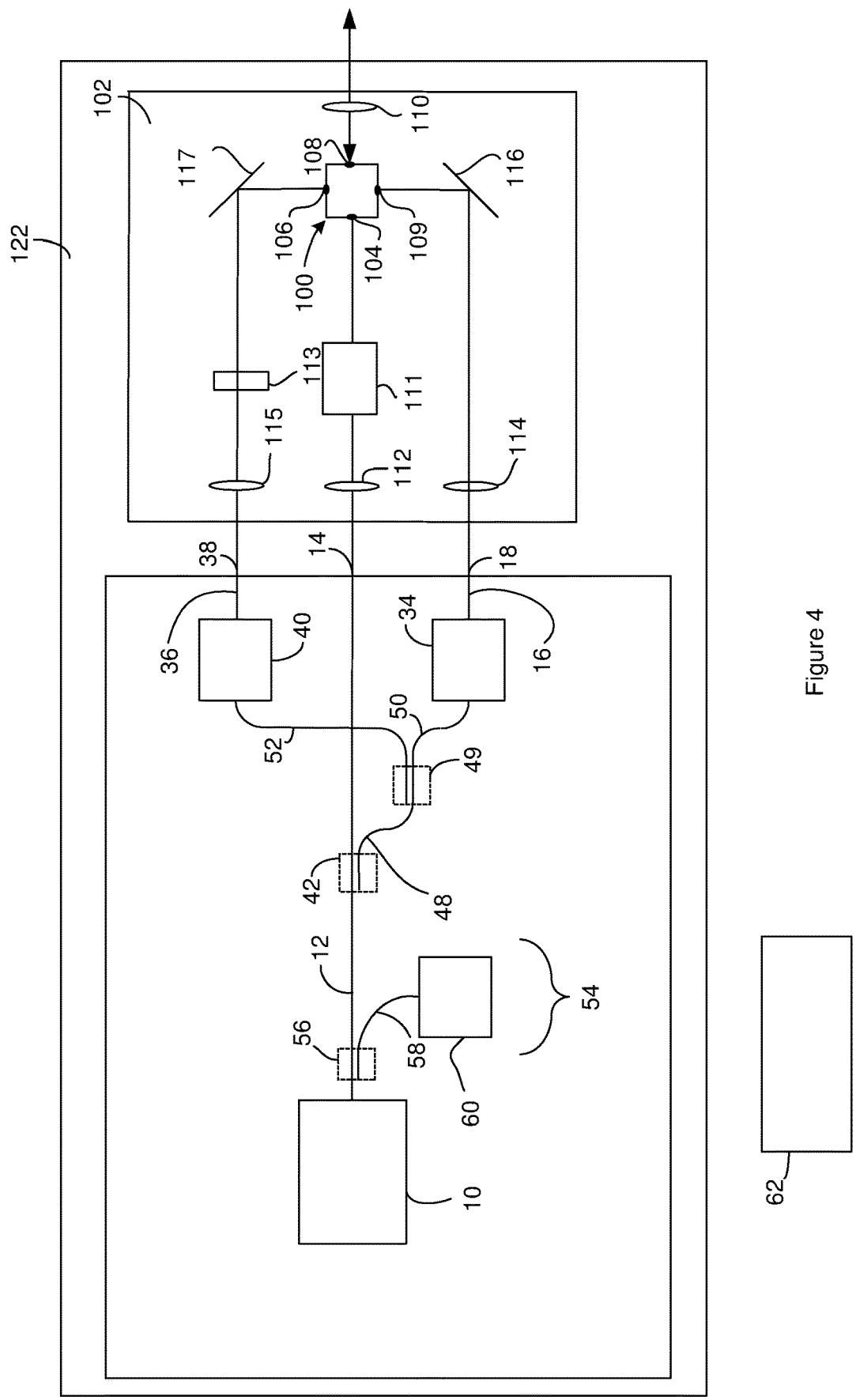
FIG. 4 is a topview of a LIDAR assembly that includes the LIDAR chip and electronics of FIG. 1 and the LIDAR adapter of FIG. 3 on a common support.

The LIDAR chip, electronics, and the LIDAR adapter can be positioned on a common mount. Suitable common mounts include, but are not limited to, glass plates, metal plates, silicon plates and ceramic plates. As an example, FIG. 4 is a topview of a LIDAR assembly that includes the LIDAR chip and electronics 62 of FIG. 1 and the LIDAR adapter of FIG. 3 on a common support 122. Although the electronics 62 are illustrated as being located on the common support, all or a portion of the electronics can be located off the common support. Suitable approaches for mounting the LIDAR chip, electronics, and/or the LIDAR adapter on the common support include, but are not limited to, epoxy, solder, and mechanical clamping.

Figure 5:
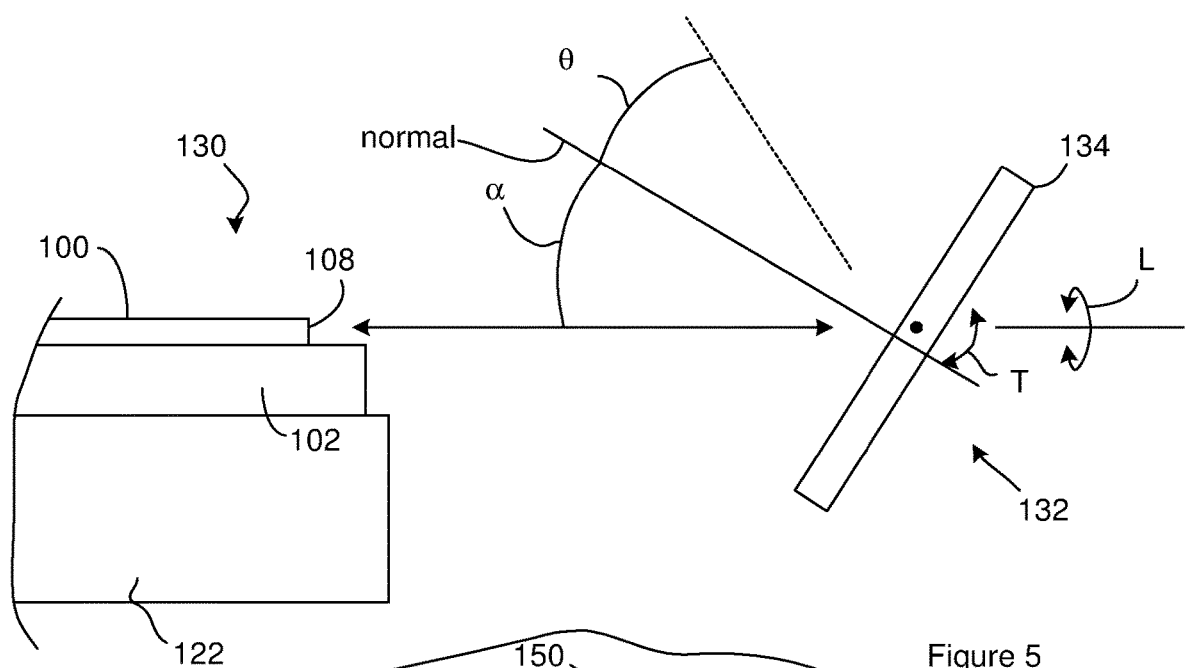
FIG. 5 is a cross section of a LIDAR system that includes a LIDAR assembly in optical communication with a directional component that includes a mirror.

A LIDAR system can include the LIDAR assembly 130 employed in conjunction with a directional component 132. The directional component 132 can be configured to steer the LIDAR output signal to a series of different sample regions in a field of view. FIG. 5 is a cross section of a LIDAR system that includes a LIDAR assembly 130 in optical communication with a directional component 132. The cross section is taken through the LIDAR output signal and perpendicular to the common support 122. The LIDAR assembly 130 can be constructed as disclosed above. For instance, the LIDAR assembly 130 can be constructed according to FIG. 4.

The directional component 132 includes a mirror 134 configured to receive the LIDAR output signal from the LIDAR assembly 130. The mirror 134 reflects the LIDAR output signal. When the LIDAR output signal reflected by an object in the path of the LIDAR output signal, a portion of the reflected light returns to the mirror 134 as the LIDAR return signal. The mirror 134 is configured to direct the LIDAR return signal to the LIDAR assembly 130.

The mirror 134 can be rotated in one or more directions in order to steer the direction that the LIDAR output signal travels away from the mirror 134. The one or more rotations of the mirror 134 can be performed by motors and/or actuation mechanism including, but not limited to, motors such as electromagnetic motors including voice coil motors and piezoelectric motors.

In some instances, the mirror 134 can be rotated such that the angle of incidence (a) of the first LIDAR input signal on the mirror 134 does not change or does not change substantially. For instance, the mirror 134 can be rotated around an axis that is parallel to the direction of the LIDAR output signal and includes the location where the direction of the LIDAR output signal is incident on the mirror 134 (the incident axis) as illustrated by the arrow labeled L in FIG. 5. Since the angle of incidence (a) does not substantially change during these rotations, the angular direction the LIDAR output signal travels away from the mirror 134 ($\theta$) remains constant or substantially constant.

Additionally or alternately, the optical gating can be rotated so as to change the angle of incidence (a) of the LIDAR output signal on the mirror 134. For instance, the mirror 134 can be rotated around a transverse axis that is perpendicular to the incident axis and parallel to a plane of the mirror 134 and/or extends through the mirror 134 as illustrated by the arrow labeled T in FIG. 5. In some instances, the transverse axis is selected such that the location where the direction of the LIDAR output signal is incident on the mirror 134 does not change or does not change substantially during the rotation in order to reduce possible movement of a portion of the LIDAR output signal off the optical grating. Since the angle of incidence ($\alpha$) changes during this rotation, the angular direction that each LIDAR output signal travels away from the mirror 134 ($\theta$) changes in response to the rotation.

The directional component 132 can optionally include one or more active and/or one or more passive optical components between the mirror 134 and the LIDAR assembly 130. Examples of suitable passive optical components include, but are not limited to, optical fibers, lenses, mirrors, polarizers, polarization splitters, polarization rotators, and wave plates. Active components include components where electrical energy is applied to and/or received from the component in order for the optical component to provide its intended function. Examples of suitable active optical components include, but are not limited to, amplifiers 140, actuated mirrors, and actuated lenses.

Figure 6A:
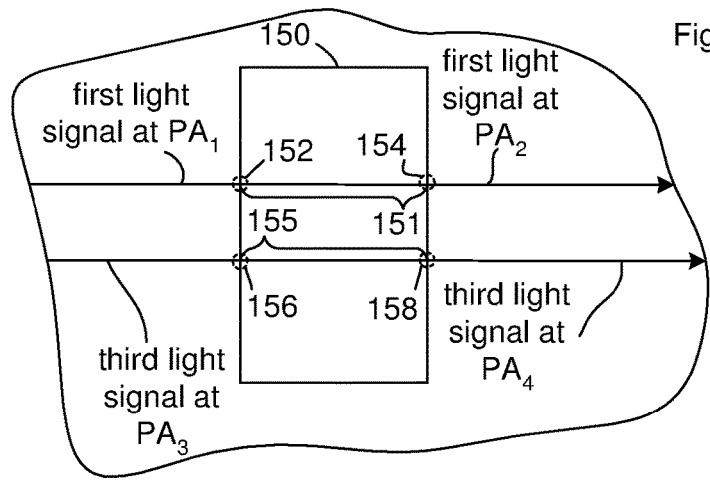
FIG. 6A and FIG. 6B are schematic diagrams illustrating an example of a polarization component for use in the LIDAR assembly.
Figure 6B:
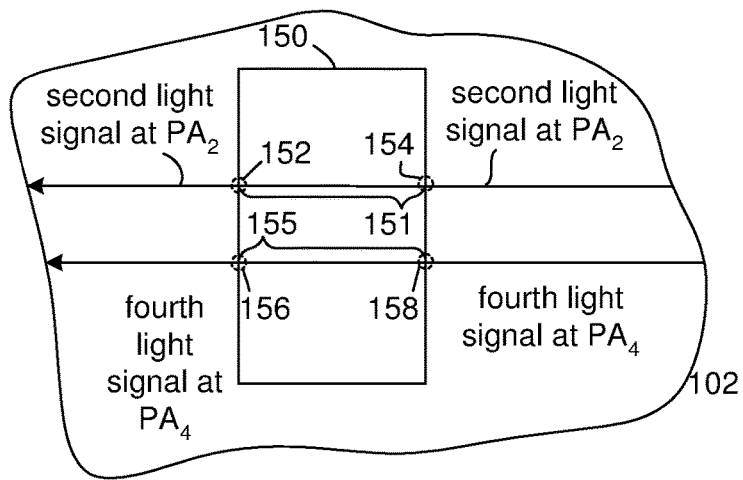

An example of a circulator 100 that is suitable for use with the LIDAR assembly includes a polarization component. FIG. 6A and FIG. 6B are schematic diagrams illustrating an example of a suitable polarization component. FIG. 6A illustrates operation of the polarization component on a first light signal and a second light signal. FIG. 6B illustrates operation of the polarization component shown in FIG. 6A on a third light signal and a fourth light signal.

The polarization component 150 is configured receive the first light signal such that the first light signal travels an optical pathway 151 from a first location 152 on the polarization component to a second location 154 of the polarization component. The polarization component is configured to change the polarization angle of the first light signal as the first light signal travels along the optical pathway 151. For instance, the polarization angle of the first light signal is changed such that the first light signal enters the polarization component at the first location 152 with a first polarization angle ($PA_1$) and exits the polarization component at the first location 152 with a second polarization angle ($PA_2$) that is different from the first polarization angle.

The polarization component 150 is also configured to receive a second light signal such that the second light signal travels the optical pathway 151 from the second port to the first port. The polarization component changes the polarization angle of the second light signal as the second light signal travels along the optical pathway 151. For instance, the polarization angle of the second light signal is changed such that the second light signal enters the polarization component at the second location 154 with the second polarization angle ($PA_2$) and exits the polarization component at the first location 152 with the second polarization angle ($PA_2$).

The polarization component 150 is also configured to receive a third light signal such that the third light signal travels a second optical pathway 155 from a third location 156 of the polarization component to a fourth location 158 of the polarization component. The second optical pathway 155 is different from the optical pathway 151. The polarization component is configured to change the polarization angle of the third light signal as the third light signal travels along the second optical pathway 155. For instance, the polarization angle of the third light signal is changed such that the third light signal enters the polarization component at the third location 156 with a third polarization angle ($PA_3$) and exits the polarization component at the fourth location 158 with a fourth polarization angle ($PA_4$) that is different from the third polarization angle ($PA_3$).

The polarization component 150 is also configured to receive a fourth light signal such that the fourth light signal travels the second optical pathway 151 from the fourth location 158 to the third location 156. The polarization component 150 is configured to change the polarization angle of the fourth light signal as the fourth light signal travels along the second optical pathway 155. For instance, the polarization angle of the fourth light signal is changed such that the fourth light signal enters the polarization component at the fourth location 158 with the fourth polarization angle ($PA_4$) and exits the polarization component at the third location 156 with the fourth polarization angle ($PA_4$). In some instances, the fourth polarization angle ($PA_4$) is the same as the second polarization angle ($PA_2$) and the third polarization angle ($PA_3$) is the same as the first polarization angle ($PA_1$).

Figure 6C:
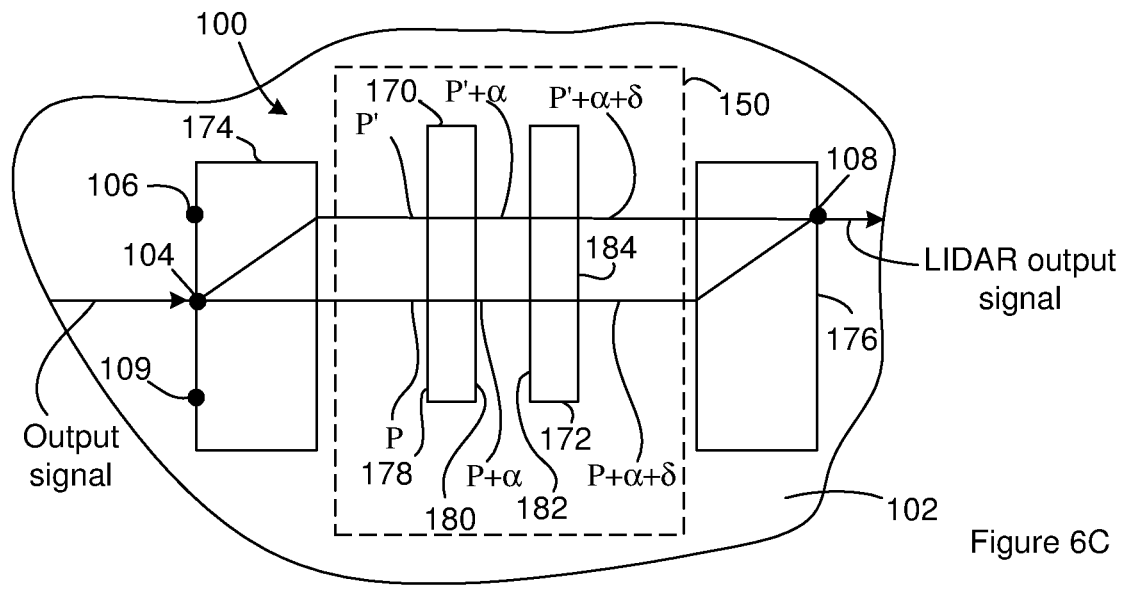
FIG. 6C and FIG. 6D illustrate an example of circulator that is suitable for use with the LIDAR assembly.
Figure 6D:
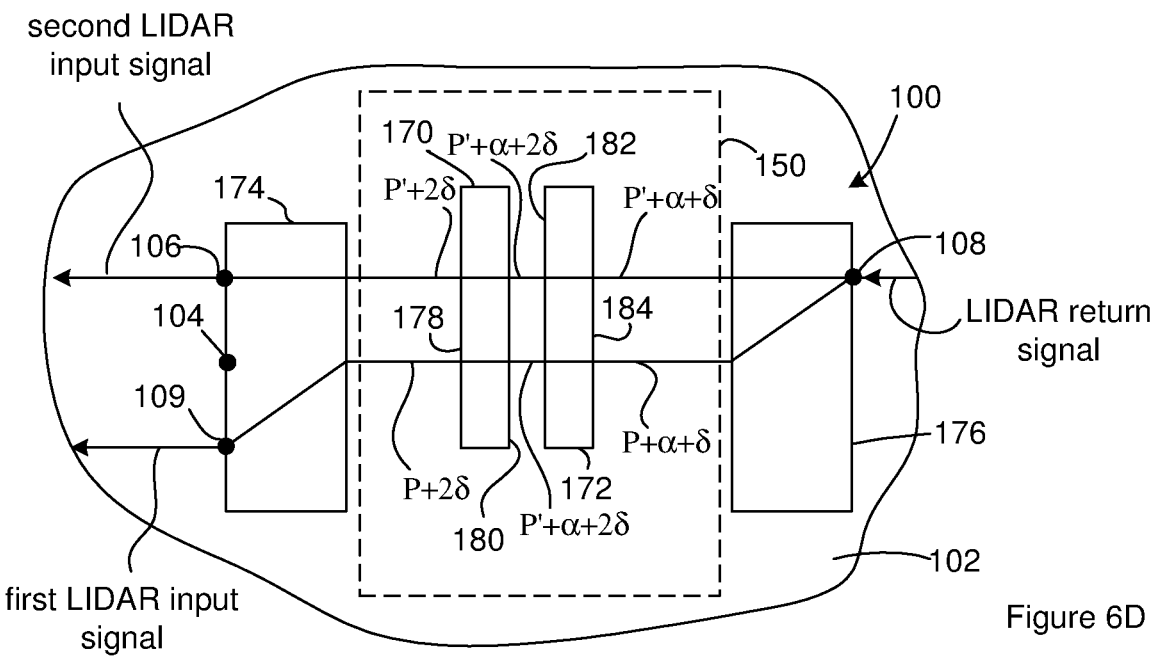

FIG. 6C and FIG. 6D illustrates an example of a circulator 100 that includes a polarization component 150 constructed according to FIG. 6A and FIG. 6B. FIG. 6C and FIG. 6D are each a topview of the same portion of an adapter that includes a circulator 100. FIG. 6C illustrates the path of the LIDAR output signal through the circulator from the first port 104 to the third port 108.

The circulator 100 includes a first polarization rotator 170 and a second polarization rotator 172 located on an optical path between a first polarization splitter 174 and a second polarization splitter 176. The first polarization splitter 174 and the first polarization splitter 174 can be configured to act as demulitplexer/multiplexers based on polarization state rather than wavelength. For instance, first polarization splitter 174 receives the LIDAR output signal at a first port 104 of the first polarization splitter 174. The first polarization splitter 174 is configured to spatially separate (demultiplex) the LIDAR output signal onto multiple different paths based on polarization. For instance, the first polarization splitter 174 spatially separates the LIDAR output signal into a first split output signal that carries light in a first polarization state and a second split output signal that carries light in a second polarization state. The polarization angle of the first polarization state is labeled P in FIG. 6C and the polarization angle of the second polarization state is labeled P in FIG. 6C. Since the first split output signal and the second split output signal have different polarization angles, the first split output signal and the second split output signal travel different paths through the first polarization splitter 174. The first split output signal and a second split output signal each exits from the first polarization splitter 174 at a different location. Suitable first polarization splitters 174 include, but are not limited to, birefringent crystals such as calcite and magnesium fluoride.

The first split output signal and the second split output signal are received at the first polarization rotator 170. The first split output signal travels through the first polarization rotator 170 on a first optical path between a first side 178 and a second side 180. The second split output signal travels through the first polarization rotator 170 on a second optical path between the first side 178 and the second side 180 of the first polarization rotator 170. The first polarization rotator 170 is configured to rotate the polarization state of the first split output signal and the second split output signal by a first rotation angle (a). For instance, the first polarization rotator 170 can be configured to rotate the polarization state of light traveling from the first side 178 to the second side 180 by the first rotation angle. As a result, the first split output signal exits from the first polarization rotator 170 with a polarization angle of P+α and the second split output signal exits from the first polarization rotator 170 with a polarization angle of P'+α. The first split output signal that exits from the first polarization rotator 170 can serve as a first rotated signal. The second split output signal that exits from the first polarization rotator 170 can serve as a second rotated signal.

The first rotated signal and the second rotated signal are received at the second polarization rotator 172. The second polarization rotator 172 is configured to rotate the polarization state of the first rotated signal and the second rotated signal by a second rotation angle (δ). For instance, the second polarization rotator 172 can be configured to rotate the polarization state of light traveling from a first side 182 to a second side 184 of the second polarization rotator 172 by the second rotation angle. As a result, the first rotated signal exits from the second polarization rotator 172 with a polarization angle of P+α+δ and the second rotated signal exits from the second polarization rotator 172 with a polarization angle of P'+α+δ. The first rotated signal that exits from the second polarization rotator 172 can serve as a first multi-rotation signal. The second rotated signal that exits from the second polarization rotator 172 can serve as a second multi-rotation signal.

The first multi-rotation signal and the second multi-rotation signal are received by the second polarization splitter 176 at different locations on the second multi-rotation signal. The first multi-rotation signal and the second multi-rotation signal can travel through the second polarization splitter 176 on different optical paths. When the polarization angle of the first multi-rotation signal is the same as the polarization angle of the second split output signal and the polarization angle of the second multi-rotation signal is the same as the polarization angle of the first split output signal, the second polarization splitter 176 combines (multiplexes) the first multi-rotation signal and the second multi-rotation signal so as to form the LIDAR output signal that exits from the second polarization splitter 176 at the third port 108. Suitable second polarization splitters 176 include, but are not limited to, birefringent crystals such as calcite or magnesium fluoride.

FIG. 6D illustrates the circulator of FIG. 6C but with the LIDAR return signal traveling through the circulator 100 from the third port 108 to the second port 106 and the fourth port 109. The LIDAR return signal is received by the second polarization splitter 176 at the third port 108 of the second polarization splitter 176. The second polarization splitter 176 is configured to spatially separate (demultiplex) the LIDAR return signal onto multiple different paths based on polarization. The portion of the LIDAR return signal having the polarization angle of the second multi-rotation signal travels through the second polarization splitter 176 on a path that is the reverse of the path that the second multi-rotation signal traveled through the second polarization splitter 176. Additionally, the portion of the LIDAR return signal having the polarization angle of the first multi-rotation signal travels through the second polarization splitter 176 on a path that is the reverse of the path that the first multi-rotation signal traveled through the second polarization splitter 176. As a result, the second polarization splitter 176 spatially separates the LIDAR return signal into a first split return signal that carries light with a polarization angle of P+α+δ and a second split return signal that carries light with a polarization angle of P'+α+δ. The first split return signal and the second split return signal each travels a different path through the second polarization splitter 176. The first split return signal and a second split return signal each exits from the second polarization splitter 176 at a different location.

The first split return signal and the second split return signal are received at the second polarization rotator 172. The first split return signal travels through the second polarization rotator 172 on a first optical path between the second side 184 and the first side 182 of the second polarization rotator 172. The second split return signal travels through the second polarization rotator 172 on a second optical path between the second side 184 and the first side 182 of the second polarization rotator 172. The second polarization rotator 172 is configured to rotate the polarization state of the first split return signal and the second split return signal by the second rotation angle (δ). For instance, the second polarization rotator 172 can be configured to rotate the polarization state of light traveling from the second side 184 to the first side 182 by the second rotation angle. As a result, the first split return signal exits from the second polarization rotator 172 with a polarization angle of P+α+2δ and the second split return signal exits from the second polarization rotator 172 with a polarization angle of P'+α+2δ. The first split return signal that exits from the second polarization rotator 172 can serve as a first rotated return signal. The second split return signal that exits from the second polarization rotator 172 can serve as a second rotated return signal.

The first rotated return signal and the second rotated return signal are received at the first polarization rotator 170. The first polarization rotator 170 is configured to rotate the polarization state of the first rotated return signal and the second rotated return signal by the negative of the first rotation angle (−α). For instance, the second polarization rotator 172 can be configured to rotate the polarization state of light traveling from the second side 180 to the first side 178 of the first polarization rotator 170 by the first rotation angle. As a result, the first rotated return signal exits from the first polarization rotator 170 with a polarization angle of P+2δ and the second rotated return signal exits from the first polarization rotator 170 with a polarization angle of P'+2δ. The first rotated return signal that exits from the first polarization rotator 170 can serve as a first multi-rotation return signal. The second rotated signal that exits from the second polarization rotator 172 can serve as a second multi-rotation return signal.

The first polarization rotator 170 can be a direction dependent polarization rotator while the second polarization rotator 172 a direction independent polarization rotator. The polarization angle that a direction dependent polarization rotator rotates light is a function of the direction of the light. For instance, a direction dependent polarization rotator rotates the polarization state of light traveling through the polarization rotator on a first path by a first rotation angle (+α) but rotates light traveling through the polarization rotator on the reverse of the first path by the negative of the first rotation angle (−α). In contrast, the polarization angle that a direction dependent polarization rotator rotates light is not a function of the direction of the light. For instance, a direction independent polarization rotator rotates the polarization state of light traveling through the polarization rotator on a second path by a second rotation angle (+δ) and also rotates light traveling through the polarization rotator on the reverse of the second path by the second rotation angle (+δ). As a result, light signals traveling through the first polarization rotator 170 followed by the second polarization rotator 172 such as the first multi-rotation signal and the second multi-rotation signal are rotated by (+α+δ) but light signals traveling through the second polarization rotator 172 followed by the first polarization rotator 170 such as the first multi-rotation return signal and the second multi-rotation return signal are rotated by (+δ−α). When the first rotation angle is equal to the second rotation angle (i.e. +α=+δ), light signals traveling through the first polarization rotator 170 followed by the second polarization rotator 172 are rotated by +2α but light signals traveling through the second polarization rotator 172 followed by the first polarization rotator 170 are rotated by 0°.

Suitable first polarization rotators 170 include, but are not limited to, Faraday rotators. Suitable second polarization rotators 172 include, but are not limited to, half-wave plates.

The first multi-rotation return signal and the second multi-rotation return signal are received by the first polarization splitter 174 at locations that correspond to the exit locations of the first split output signal and the second split output signal. The first multi-rotation return signal and the second multi-rotation return signal travel through the first polarization splitter 174 on different optical paths. When the first multi-rotation return signal has a different polarization angle (P+2δ) than the first split output signal (P), the first multi-rotation return signal travels a different path through the first polarization splitter 174 than the first split output signal (P). As a result, the first multi-rotation return signal exits from the first polarization splitter 174 at a fourth port 109 and serves as the first LIDAR input signal. When the second multi-rotation return signal has a different polarization angle (P'+2δ) than the first split output signal (P'), the second multi-rotation return signal travels a different path through the first polarization splitter 174 than the second split output signal (P). As a result, the second multi-rotation return signal exits from the first polarization splitter 174 at a fourth port 109 and serves as the second LIDAR input signal.

Figure 6E:
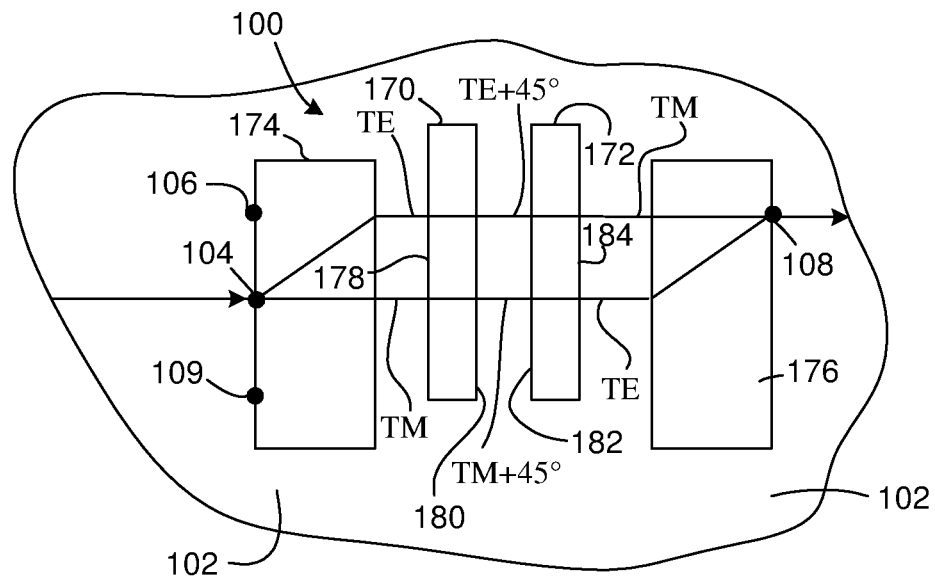
FIG. 6E is a topview of an example of the circulator of FIG. 6C and FIG. 6D.
Figure 6F:
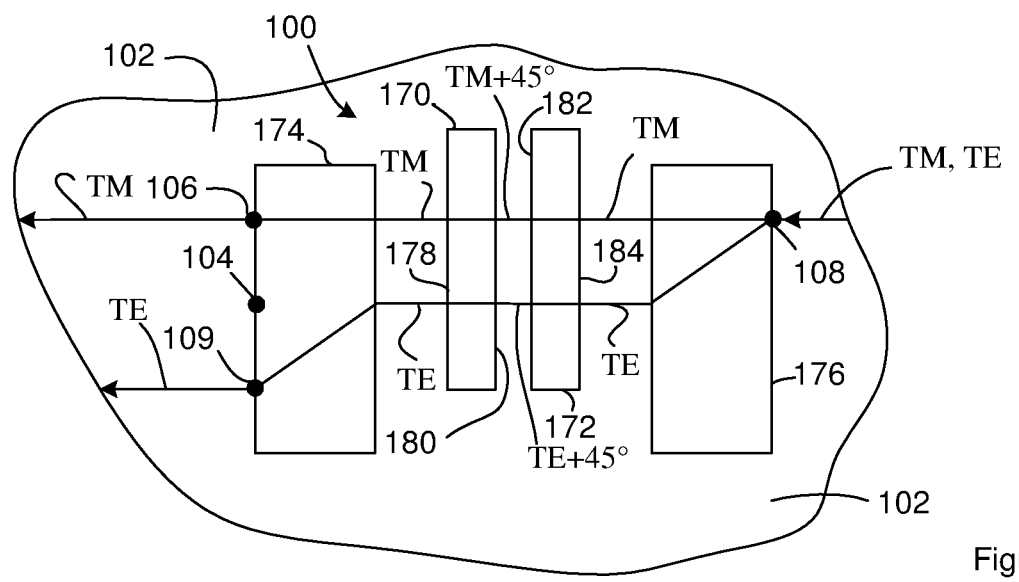
FIG. 6F is a topview of another example of the circulator of FIG. 6C and FIG. 6D.

FIG. 6E and FIG. 6F illustrate an example of the circulator of FIG. 6C and FIG. 6D where the first polarization rotator 170 and the second polarization rotator 172 are configured such that the first rotation angle is 45° (α=45°), the second rotation angle is 45° (δ=45°), the first polarization angle (P) is a first polarization state TM and the second polarization angle P' is a second polarization state TE. Since TM+90°=TE and TE+90°=TM, light signals traveling through the first polarization rotator 170 followed by the second polarization rotator 172 such as the first multi-rotation signal and the second multi-rotation signal are rotated from TM to TW or TE to TM but light signals traveling through the second polarization rotator 172 followed by the first polarization rotator 170 such as the first multi-rotation return signal and the second multi-rotation return exit from the first polarization rotator 170 in the same polarization state that the light entered the first polarization rotator 170.

The first split output signal, the first rotated signal, and the first multi-rotation signal disclosed in the context of FIG. 6C through FIG. 6F combine to serve as the first light signal disclosed in the context of FIG. 6A and FIG. 6B. The first split return signal, first rotated return signal, and the first multi-rotation return signal disclosed in the context of FIG. 6C through FIG. 6F combine to serve as the second light signal disclosed in the context of FIG. 6A and FIG. 6B. The second split output signal, the second rotated signal, and the second multi-rotation signal disclosed in the context of FIG. 6C through FIG. 6F combine to serve as the third light signal disclosed in the context of FIG. 6A and FIG. 6B. The second split return signal, second rotated return signal, and the second multi-rotation return signal disclosed in the context of FIG. 6C through FIG. 6F combine to serve as the fourth light signal disclosed in the context of FIG. 6A and FIG. 6B.

Although FIG. 6C and FIG. 6F illustrate the output signal including light of a first polarization state and light of a second polarization state, in some instances, the output signal includes light of a single polarization state and accordingly of a single polarization angle. As a result, in some instances, the first signal or the second signal is not present in the circulator during the operation of the LIDAR system.

Figure 7A:
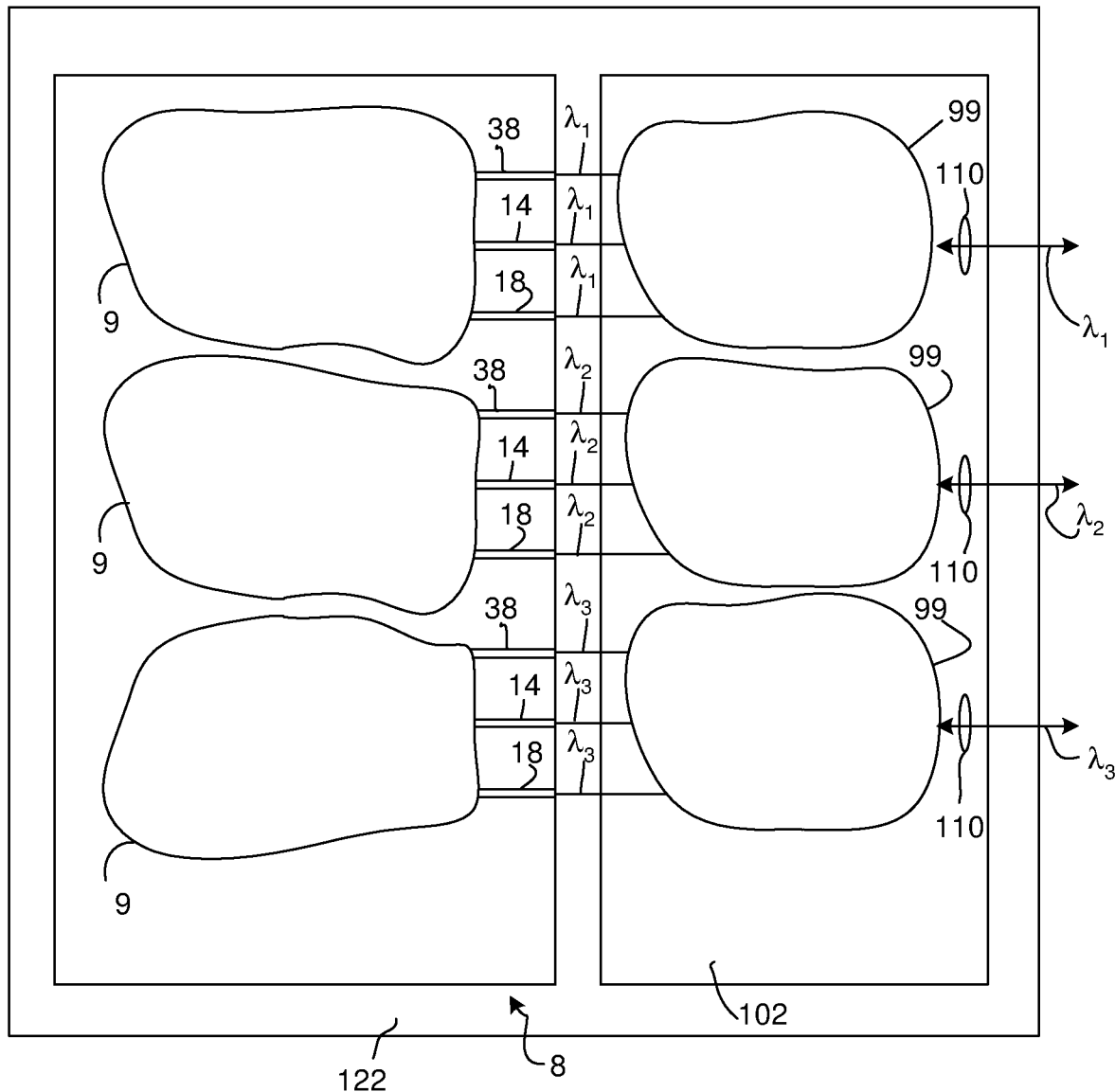
FIG. 7A is a topview of a LIDAR assembly that includes a LIDAR chip, electronics, and a LIDAR adapter on a common support.

FIG. 1A through FIG. 6F disclose a LIDAR system that outputs a LIDAR output signal carrying a single channel. However, the LIDAR system can be scaled to output multiple LIDAR output signals that each carries a different channel. For instance, FIG. 7A is a topview of a LIDAR assembly that includes a LIDAR chip 8, electronics 62, and a LIDAR adapter on a common support 122. The LIDAR chip includes multiple different sets of chip components 9. In some instances, each set of chip components 9 is constructed according to FIG. 1. The different chip components can each be configured to output an output signal, receive a first input signal, and receive a second input signal. The output signal, first input signal, and second input signal chip associated with each one of the different chip components 9 carry a different one of the channels (labeled $\lambda_{1-3}$ in FIG. 7A). As a result, different chip components 9 can process signals carrying different channels.

The LIDAR adapter of FIG. 7A includes multiple different sets of adapter components 99 on the base 102. Each set of adapter components 99 can be constructed as disclosed in the context of FIG. 3. Accordingly, each set of adapter components 99 receives a LIDAR output signal and outputs the received LIDAR output signal, a first input signal, and a second input signal. The LIDAR output signal, the first input signal, and the second input signal operated on by different chip components 9 carry different channels. The different channels can each be at a different wavelength. The different channel wavelengths are labeled $\lambda_1$, $\lambda_2$, and $\lambda_3$ in FIG. 7A. The LIDAR system can generate LIDAR data from each of the channels.

The LIDAR output signals carrying different channels can be concurrently directed to different sample regions in a field of view. Additionally, LIDAR data can be generated from each of the different LIDAR output signals. As a result, scaling the LIDAR system up to output multiple LIDAR output signals carrying different channels allows the rate of LIDAR data generation for a field of view to be increased.

Although not illustrated in FIG. 7A, the LIDAR output signals can be received by different directional components 132 as disclosed in the context of FIG. 5. As a result, in some instances, the different LIDAR output signals can be independently steered to different sample regions in the field of view.

Figure 7B:
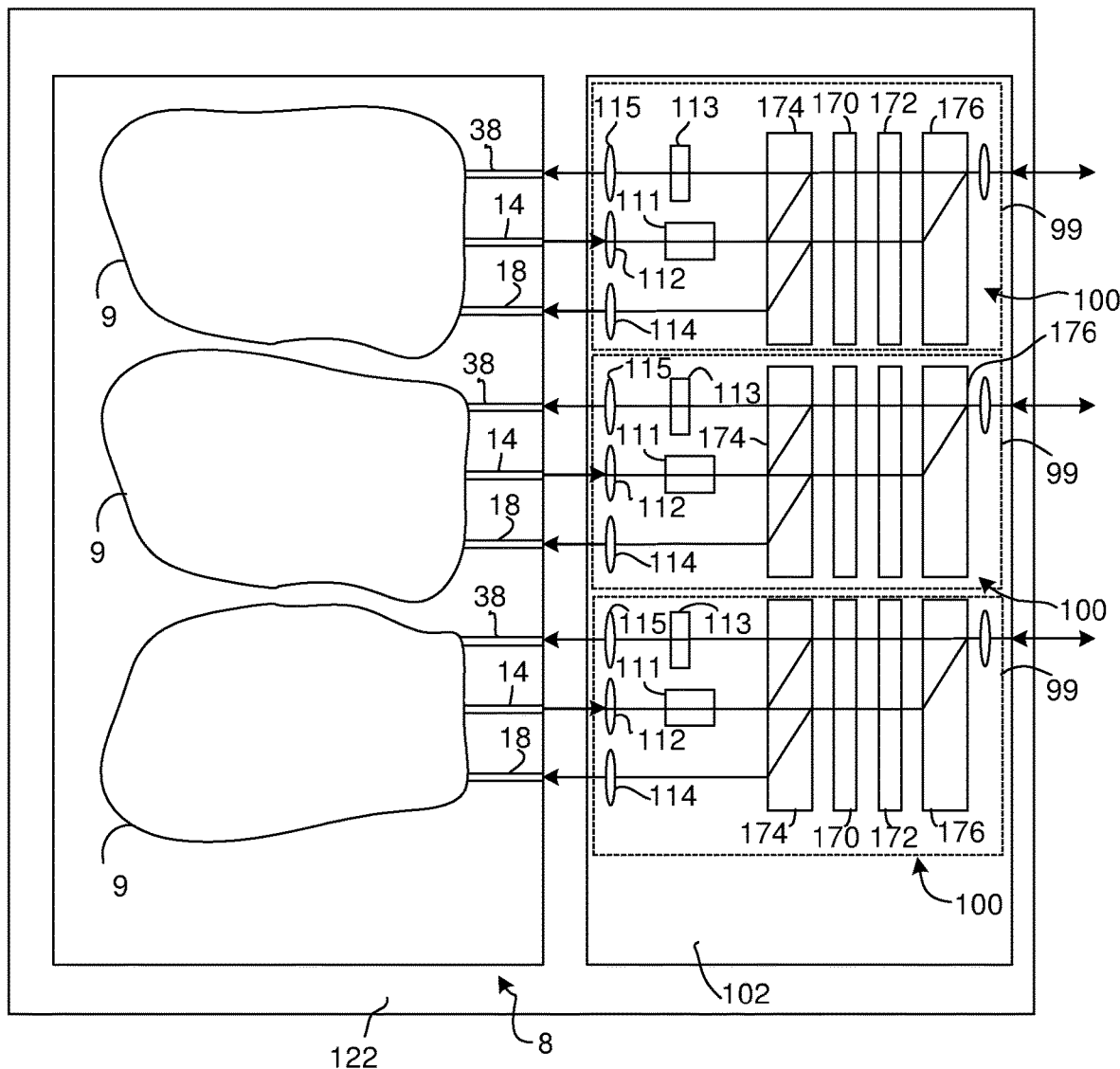
FIG. 7B is a topview of another embodiment of a LIDAR assembly that includes a LIDAR chip, electronics, and a LIDAR adapter on a common support.

Each of the adapter components 99 illustrated in FIG. 7A can each be associated with a different one of the channels. For instance, FIG. 7B is a topview of a LIDAR assembly shown in FIG. 7A where each group of adapter components 99 shown in FIG. 7A is constructed according to FIG. 3 and FIG. 6A through FIG. 6F. Each group of adapter components 99 receives and process a different one of the channels.

Figure 7C:
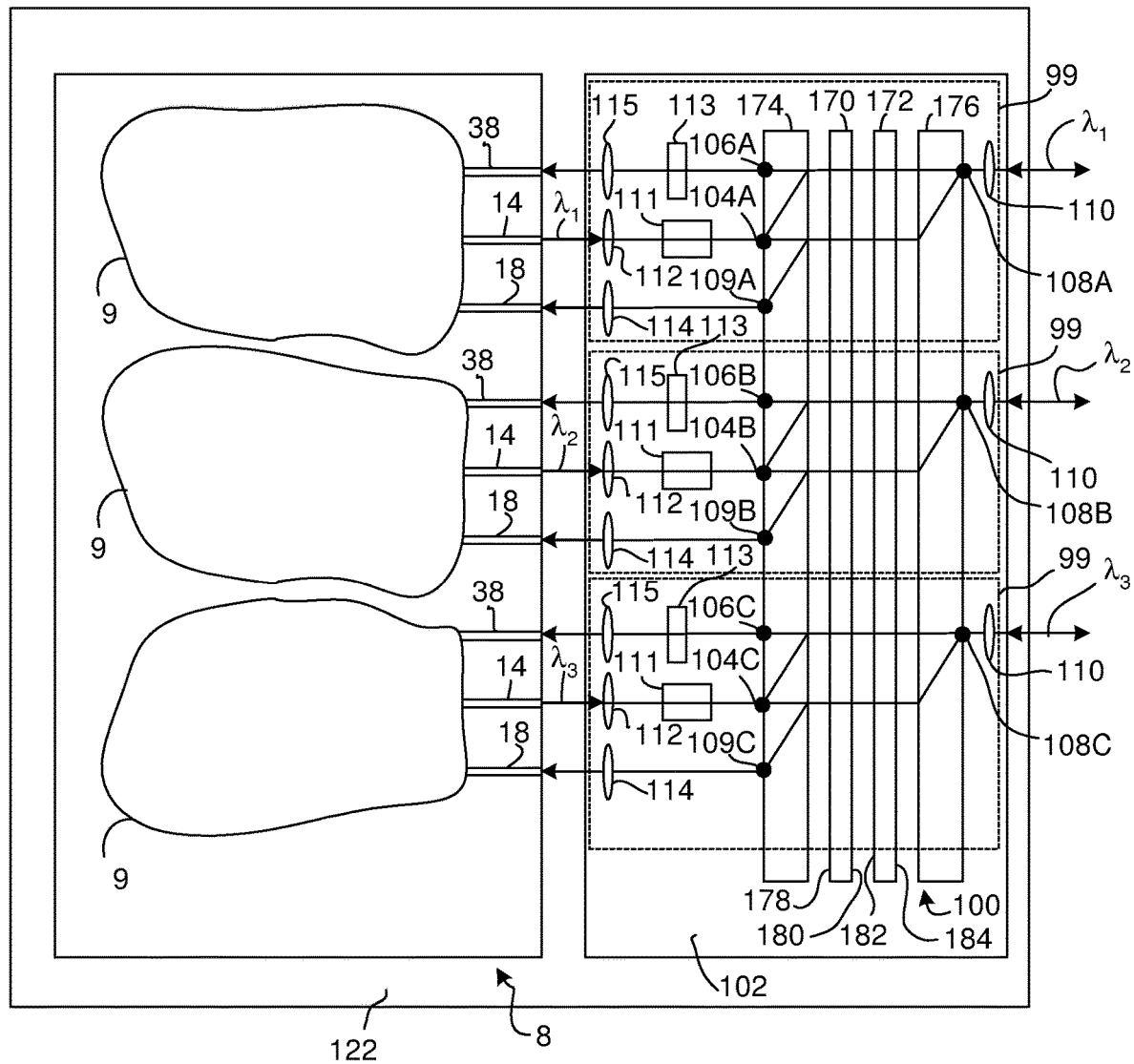
FIG. 7C is a topview of another embodiment of a LIDAR assembly that includes a LIDAR chip, electronics, and a LIDAR adapter on a common support.

The different groups of adapter components illustrated in FIG. 7A can share adapter components. For instance, FIG. 7C is a topview of a LIDAR assembly shown in FIG. 7A where the adapter components 99 shown in FIG. 7A are constructed such that a single circulator 100 is common to each group of adapter components 99. The same circulator 100 receives multiple different output signals that each carries a different channel (labeled $\lambda_{1-3}$) and also receives the multiple different LIDAR return signals that result from the different output signals and that each carries a different one of the channels. Accordingly, the light from different LIDAR return signals are processed by the same first polarization rotator 170, the same second polarization rotator 172, the same first polarization splitter 174 and the same second polarization splitter 176 so as to generate multiple different first LIDAR input signals that each carries a different channel and multiple different second LIDAR input signals that each carries a different channel. Additionally or alternately, the light from different output signals are processed by the same first polarization rotator 170, the same second polarization rotator 172, the same first polarization splitter 174 and the same second polarization splitter 176 so as to generate multiple LIDAR output signals that each carries a different channel.

The output signals, LIDAR output signals, LIDAR return signals, first LIDAR input signals, and the second LIDAR input signals carrying different channels enter or exit the circulator 100 through different ports that can be spatially separated from one another on the circulator. For instance, the output signal, LIDAR output signal, LIDAR return signal, first LIDAR input signal, and the second LIDAR input signal carrying channel $\lambda_1$ enter or exit the circulator 100 through first port 104a, second port 106a, third port 108a, and fourth port 109a; the output signal, LIDAR output signal, LIDAR return signal, first LIDAR input signal, and the second LIDAR input signal carrying channel $\lambda_2$ enter or exit the circulator 100 through first port 104b, second port 106b, third port 108b, and fourth port 109b; and the output signal, LIDAR output signal, LIDAR return signal, first LIDAR input signal, and the second LIDAR input signal carrying channel $\lambda_3$ enter or exit the circulator 100 through first port 104c, second port 106c, third port 108c, and fourth port 109c. As a result, the circulator can include one, all, or a portion of the conditions selected from the group consisting of: the different output signals being spatially separated when they enter the circulator, the different LIDAR return signals being spatially separated when they enter the circulator, the different LIDAR output signals being spatially separated when they exit the circulator, the different first LIDAR input signals being spatially separated when they exit the circulator, and the different second LIDAR input signals being spatially separated when they exit the circulator. As is evident from FIG. 7C, the different LIDAR output signals being spatially separated when they are output from the circulator can allow the LIDAR output signals to be output such that they travel away from one or more components selected from the circulator, the adapter, the LIDAR adapter and the LIAR system in different directions.

Although FIG. 7C illustrates the components of the circulator shared among the different groups of adapter components, a portion of the circulator components can be shared among the different groups of adapter components while another portion of the adapter components are not shared among the different groups of adapter components. As an example, the first polarization splitter 174 and the second polarization splitter 176 can be shared among the different groups of adapter components as shown in FIG. 7C but the different groups of adapter components can be associated with different first polarization rotators 170 and different second polarization rotators 172 as shown in FIG. 7B.

Many polarization rotators that can serve as the first polarization rotator 170 or the second polarization rotator 172 are effective for a wavelength band called an operating bandwidth. For most LIDAR applications where the adapter components 99 are constructed according to FIG. 7C, a first polarization rotator 170 and/or second polarization rotator 172 with an operating bandwidth of less than or equal to 40 nm can be used. However, when wider operating bandwidths are needed or desired, the adapter components 99 can be constructed according to FIG. 7C or a configuration can be used where the first polarization splitter 174 and the second polarization splitter 176 are shared among the different groups of adapter components as shown in FIG. 7C but the first polarization rotators 170 and the second polarization rotators 172 are not shared as shown in FIG. 7B.

The LIDAR chip includes one or more waveguides that constrain the optical path of one or more light signals. While the LIDAR adapter can include waveguides, the optical path that all or a portion of the adapter signals selected from the group consisting of the LIDAR return signal, the output signal, the LIDAR output signal, the first input signal, and/or the second input signal, the first signal, the second signal, the first split output signal, the first rotated signal, the first multi-rotation signal, first split return signal, the first rotated return signal, the first multi-rotation return signal, the split output signal, the second rotated signal, and the second multi-rotation signal, the second split return signal, the second rotated return signal, and the second multi-rotation return signal travel between the adapter components and/or between the LIDAR chip and an adapter component can be free space. For instance, all or a portion of the adapter signal(s) can travel through the atmosphere in which the LIDAR chip, the LIDAR adapter, and/or the base 102 is positioned when traveling between the different adapter components and/or between an adapter component and the LIDAR chip. As a result, adapter components such as lenses, polarization splitters, polarization rotators, and direction changing components such as mirrors can be employed to control the characteristics of the optical path traveled by the adapter signal(s).

The adapter components can be discrete components that are attached to the substrate 102. Suitable techniques for attaching discrete components to the base 102 include, but are not limited to, epoxy, solder, and mechanical clamping. In one example, one or more of the adapter components are integrated components and the remaining adapter components are discrete components. In another example, the LIDAR adapter includes one or more integrated amplifiers and the remaining adapter components are discrete components. Suitable bases 102 for the LIDAR adapter include, but are not limited to, substrates, platforms, and plates. Suitable substrates include, but are not limited to, glass, silicon, and ceramics.

FIG. 8A through FIG. 8B illustrate an example of a processing component that is suitable for use as a first processing component 34 and/or a second processing component 40. As described in the context of FIG. 1, each processing component receives a comparative signal and a reference signal from a second input waveguide 36 and second reference waveguide 52 or from a first input waveguide 16 and a first reference waveguide 50. The processing unit of FIG. 8A includes a first splitter 200 that divides a comparative signal carried on the first input waveguide 16 or the second input waveguide 36 onto a first comparative waveguide 204 and a second comparative waveguide 206. The first comparative waveguide 204 carries a first portion of the comparative signal to a light-combining component 211. The second comparative waveguide 206 carries a second portion of the comparative signal to a second light-combining component 212.

The processing unit of FIG. 8A also includes a second splitter 202 that divides a reference signal carried on the first reference waveguide 50 or the second reference waveguide 52 onto a first reference waveguide 210 and a second reference waveguide 208. The first reference waveguide 210 carries a first portion of the reference signal to the light-combining component 211. The second reference waveguide 208 carries a second portion of the reference signal to the second light-combining component 212.

The second light-combining component 212 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal.

The second light-combining component 212 also splits the resulting second composite signal onto a first auxiliary detector waveguide 214 and a second auxiliary detector waveguide 216. The first auxiliary detector waveguide 214 carries a first portion of the second composite signal to a first auxiliary light sensor 218 that converts the first portion of the second composite signal to a first auxiliary electrical signal. The second auxiliary detector waveguide 216 carries a second portion of the second composite signal to a second auxiliary light sensor 220 that converts the second portion of the second composite signal to a second auxiliary electrical signal. Examples of suitable light sensors include germanium photodiodes (PDs), and avalanche photodiodes (APDs).

In some instances, the second light-combining component 212 splits the second composite signal such that the portion of the comparative signal (i.e. the portion of the second portion of the comparative signal) included in the first portion of the second composite signal is phase shifted by 180° relative to the portion of the comparative signal (i.e. the portion of the second portion of the comparative signal) in the second portion of the second composite signal but the portion of the reference signal (i.e. the portion of the second portion of the reference signal) in the second portion of the second composite signal is not phase shifted relative to the portion of the reference signal (i.e. the portion of the second portion of the reference signal) in the first portion of the second composite signal. Alternately, the second light-combining component 212 splits the second composite signal such that the portion of the reference signal (i.e. the portion of the second portion of the reference signal) in the first portion of the second composite signal is phase shifted by 180° relative to the portion of the reference signal (i.e. the portion of the second portion of the reference signal) in the second portion of the second composite signal but the portion of the comparative signal (i.e. the portion of the second portion of the comparative signal) in the first portion of the second composite signal is not phase shifted relative to the portion of the comparative signal (i.e. the portion of the second portion of the comparative signal) in the second portion of the second composite signal. Examples of suitable light sensors include germanium photodiodes (PDs), and avalanche photodiodes (APDs).

The first light-combining component 211 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal.

The light-combining component 211 also splits the first composite signal onto a first detector waveguide 221 and a second detector waveguide 222. The first detector waveguide 221 carries a first portion of the first composite signal to a first light sensor 223 that converts the first portion of the second composite signal to a first electrical signal. The second detector waveguide 222 carries a second portion of the second composite signal to a second auxiliary light sensor 224 that converts the second portion of the second composite signal to a second electrical signal. Examples of suitable light sensors include germanium photodiodes (PDs), and avalanche photodiodes (APDs).

In some instances, the light-combining component 211 splits the first composite signal such that the portion of the comparative signal (i.e. the portion of the first portion of the comparative signal) included in the first portion of the composite signal is phase shifted by 180° relative to the portion of the comparative signal (i.e. the portion of the first portion of the comparative signal) in the second portion of the composite signal but the portion of the reference signal (i.e. the portion of the first portion of the reference signal) in the first portion of the composite signal is not phase shifted relative to the portion of the reference signal (i.e. the portion of the first portion of the reference signal) in the second portion of the composite signal. Alternately, the light-combining component 211 splits the composite signal such that the portion of the reference signal (i.e. the portion of the first portion of the reference signal) in the first portion of the composite signal is phase shifted by 180° relative to the portion of the reference signal (i.e. the portion of the first portion of the reference signal) in the second portion of the composite signal but the portion of the comparative signal (i.e. the portion of the first portion of the comparative signal) in the first portion of the composite signal is not phase shifted relative to the portion of the comparative signal (i.e. the portion of the first portion of the comparative signal) in the second portion of the composite signal.

When the second light-combining component 212 splits the second composite signal such that the portion of the comparative signal in the first portion of the second composite signal is phase shifted by 180° relative to the portion of the comparative signal in the second portion of the second composite signal, the light-combining component 211 also splits the composite signal such that the portion of the comparative signal in the first portion of the composite signal is phase shifted by 180° relative to the portion of the comparative signal in the second portion of the composite signal. When the second light-combining component 212 splits the second composite signal such that the portion of the reference signal in the first portion of the second composite signal is phase shifted by 180° relative to the portion of the reference signal in the second portion of the second composite signal, the light-combining component 211 also splits the composite signal such that the portion of the reference signal in the first portion of the composite signal is phase shifted by 180° relative to the portion of the reference signal in the second portion of the composite signal.

The first reference waveguide 210 and the second reference waveguide 208 are constructed to provide a phase shift between the first portion of the reference signal and the second portion of the reference signal. For instance, the first reference waveguide 210 and the second reference waveguide 208 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 210 and the second reference waveguide 208 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

The first light sensor 223 and the second light sensor 224 can be connected as a balanced detector and the first auxiliary light sensor 218 and the second auxiliary light sensor 220 can also be connected as a balanced detector. For instance, FIG. 8B provides a schematic of the relationship between the electronics, the first light sensor 223, the second light sensor 224, the first auxiliary light sensor 218, and the second auxiliary light sensor 220. The symbol for a photodiode is used to represent the first light sensor 223, the second light sensor 224, the first auxiliary light sensor 218, and the second auxiliary light sensor 220 but one or more of these sensors can have other constructions. In some instances, all of the components illustrated in the schematic of FIG. 8B are included on the LIDAR chip. In some instances, the components illustrated in the schematic of FIG. 8B are distributed between the LIDAR chip and electronics located off of the LIDAR chip.

The electronics connect the first light sensor 223 and the second light sensor 224 as a first balanced detector 225 and the first auxiliary light sensor 218 and the second auxiliary light sensor 220 as a second balanced detector 226. In particular, the first light sensor 223 and the second light sensor 224 are connected in series. Additionally, the first auxiliary light sensor 218 and the second auxiliary light sensor 220 are connected in series. The serial connection in the first balanced detector is in communication with a first data line 228 that carries the output from the first balanced detector as a first data signal. The serial connection in the second balanced detector is in communication with a second data line 232 that carries the output from the second balanced detector as a second data signal. The first data signal is an electrical representation of the first composite signal and the second data signal is an electrical representation of the second composite signal. Accordingly, the first data signal includes a contribution from a first waveform and a second waveform and the second data signal is a composite of the first waveform and the second waveform. The portion of the first waveform in the first data signal is phase-shifted relative to the portion of the first waveform in the first data signal but the portion of the second waveform in the first data signal being in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. The first data signal and the second data signal are beating as a result of the beating between the comparative signal and the reference signal, i.e. the beating in the first composite signal and in the second composite signal.

The electronics 62 includes a transform mechanism 238 configured to perform a mathematical transform on the first data signal and the second data signal. For instance, the mathematical transform can be a complex Fourier transform with the first data signal and the second data signal as inputs. Since the first data signal is an in-phase component and the second data signal its quadrature component, the first data signal and the second data signal together act as a complex data signal where the first data signal is the real component and the second data signal is the imaginary component of the input.

The transform mechanism 238 includes a first Analog-to-Digital Converter (ADC) 264 that receives the first data signal from the first data line 228. The first Analog-to-Digital Converter (ADC) 264 converts the first data signal from an analog form to a digital form and outputs a first digital data signal. The transform mechanism 238 includes a second Analog-to-Digital Converter (ADC) 266 that receives the second data signal from the second data line 232. The second Analog-to-Digital Converter (ADC) 266 converts the second data signal from an analog form to a digital form and outputs a second digital data signal. The first digital data signal is a digital representation of the first data signal and the second digital data signal is a digital representation of the second data signal. Accordingly, the first digital data signal and the second digital data signal act together as a complex signal where the first digital data signal acts as the real component of the complex signal and the second digital data signal acts as the imaginary component of the complex data signal.

The transform mechanism 238 includes a transform component 268 that receives the complex data signal. For instance, the transform component 268 receives the first digital data signal from the first Analog-to-Digital Converter (ADC) 264 as an input and also receives the second digital data signal from the first Analog-to-Digital Converter (ADC) 266 as an input. The transform component 268 can be configured to perform a mathematical transform on the complex signal so as to convert from the time domain to the frequency domain. The mathematical transform can be a complex transform such as a complex Fast Fourier Transform (FFT). A complex transform such as a complex Fast Fourier Transform (FFT) provides an unambiguous solution for the shift in frequency of a comparative signal relative to the LIDAR output signal. The electronics use the one or more frequency peaks output from the transform component 268 for further processing to generate the LIDAR data (distance and/or radial velocity between the reflecting object and the LIDAR chip or LIDAR system). The transform component 268 can execute the attributed functions using firmware, hardware or software or a combination thereof.

Figure 8C:
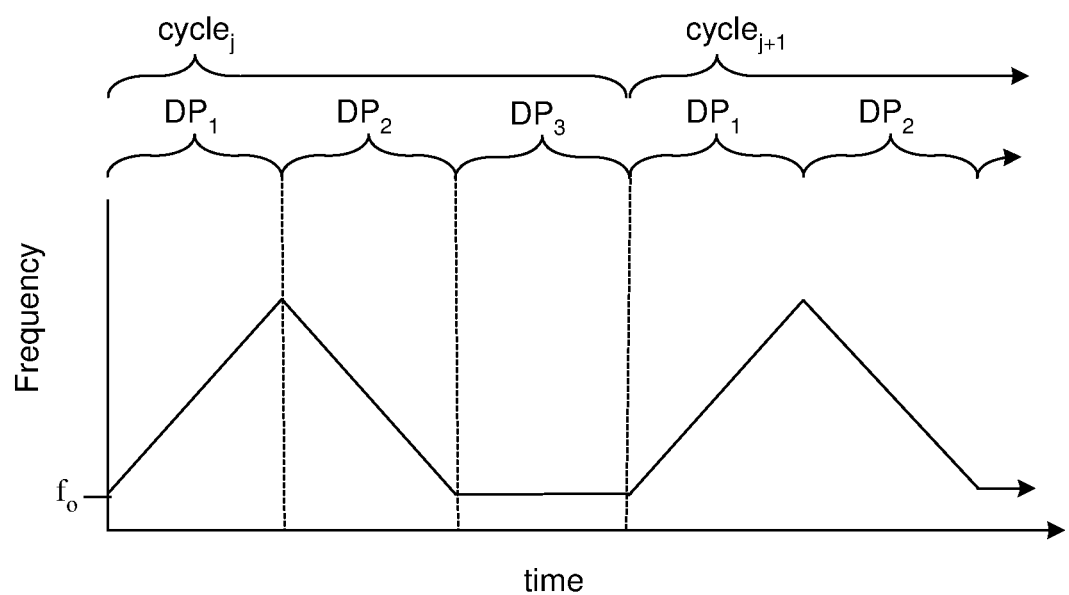
FIG. 8C is a graph of frequency versus time for a LIDAR output signal.

FIG. 8C shows an example of a relationship between the frequency of the LIDAR output signal, time, cycles and data periods. Although FIG. 8C shows frequency versus time for only one channel, the illustrated frequency versus time pattern can represent the frequency versus time for each of the channels. The base frequency of the LIDAR output signal ($f_o$) can be the frequency of the LIDAR output signal at the start of a cycle.

FIG. 8C shows frequency versus time for a sequence of two cycles labeled $cycle_j$ and $cycle_{j+1}$. In some instances, the frequency versus time pattern is repeated in each cycle as shown in FIG. 8C. The illustrated cycles do not include re-location periods and/or re-location periods are not located between cycles. As a result, FIG. 8C illustrates the results for a continuous scan.

Each cycle includes K data periods that are each associated with a period index k and are labeled $DP_k$. In the example of FIG. 8C, each cycle includes three data periods labeled $DP_k$ with k=1, 2, and 3. In some instances, the frequency versus time pattern is the same for the data periods that correspond to each other in different cycles as is shown in FIG. 8C. Corresponding data periods are data periods with the same period index. As a result, each data period $DP_1$ can be considered corresponding data periods and the associated frequency versus time patterns are the same in FIG. 8C. At the end of a cycle, the electronics return the frequency to the same frequency level at which it started the previous cycle.

During the data period $DP_1$, and the data period $DP_2$, the electronics operate the light source such that the frequency of the LIDAR output signal changes at a linear rate a. The direction of the frequency change during the data period $DP_1$ is the opposite of the direction of the frequency change during the data period $DP_2$.

The frequency output from the Complex Fourier transform represents the beat frequency of the composite signals that each includes a comparative signal beating against a reference signal. The beat frequencies ($f_{LDP}$) from two or more different data periods can be combined to generate the LIDAR data. For instance, the beat frequency determined from $DP_1$ in FIG. 8C can be combined with the beat frequency determined from $DP_2$ in FIG. 8C to determine the LIDAR data. As an example, the following equation applies during a data period where electronics increase the frequency of the outgoing LIDAR signal during the data period such as occurs in data period $DP_1$ of FIG. 8C: $f_{ub}=-f_d+\alpha\tau$ where $f_{ub}$ is the frequency provided by the transform component ($f_{LDP}$ determined from $DP_1$ in this case), $f_d$ represents the Doppler shift ($f_d=2vf_c/c$) where $f_c$ represents the optical frequency ($f_o$), c represents the speed of light, v is the radial velocity between the reflecting object and the LIDAR system where the direction from the reflecting object toward the chip is assumed to be the positive direction, and c is the speed of light. The following equation applies during a data period where electronics decrease the frequency of the outgoing LIDAR signal such as occurs in data period $DP_2$ of FIG. 8C: $f_{db}=-f_d-\alpha\tau$ where $f_{db}$ is a frequency provided by the transform component ($f_{i,LDP}$ determined from $DP_2$ in this case). In these two equations, $f_d$ and $\tau$ are unknowns. The electronics solve these two equations for the two unknowns. The radial velocity for the sample region then be determined from the Doppler shift ($v=c*f_d/(2f_c)$) and/or the separation distance for that sample region can be determined from $c*f_\tau/2$. Since the LIDAR data can be generated for each corresponding frequency pair output by the transform, separate LIDAR data can be generated for each of the objects in a sample region. Accordingly, the electronics can determine more than one radial velocity and/or more than one radial separation distance from a single sampling of a single sample region in the field of view.

The data period labeled $DP_3$ in FIG. 8C is optional. As noted above, there are situations where more than one object is present in a sample region. For instance, during the feedback period in $DP_i$ for cycle$_2$ and also during the feedback period in $DP_2$ for cycle$_2$, more than one frequency pair can be matched. In these circumstances, it may not be clear which frequency peaks from $DP_2$ correspond to which frequency peaks from $DP_1$. As a result, it may be unclear which frequencies need to be used together to generate the LIDAR data for an object in the sample region. As a result, there can be a need to identify corresponding frequencies. The identification of corresponding frequencies can be performed such that the corresponding frequencies are frequencies from the same reflecting object within a sample region. The data period labeled $DP_3$ can be used to find the corresponding frequencies. LIDAR data can be generated for each pair of corresponding frequencies and is considered and/or processed as the LIDAR data for the different reflecting objects in the sample region.

An example of the identification of corresponding frequencies uses a LIDAR system where the cycles include three data periods ($DP_i$, $DP_2$, and $DP_3$) as shown in FIG. 8C. When there are two objects in a sample region illuminated by the LIDAR outputs signal, the transform component outputs two different frequencies for $f_{ub}$: $f_{u1}$ and $f_{u2}$ during $DP_1$ and another two different frequencies for $f_{ab}$: $f_{d1}$ and $f_{d2}$ during $DP_2$. In this instance, the possible frequency pairings are: ($f_{d1}$, $f_{u1}$); ($f_{d1}$, $f_{u2}$); ($f_{d2}$, $f_{u1}$); and ($f_{d2}$, $f_{du2}$). A value of $f_d$ and $\tau$ can be calculated for each of the possible frequency pairings. Each pair of values for $f_d$ and $\tau$ can be substituted into $f_3=-f_d+\alpha_3\tau_0$ to generate a theoretical $f_3$ for each of the possible frequency pairings. The value of $\alpha_3$ is different from the value of a used in $DP_1$ and $DP_2$. In FIG. 8C, the value of $\alpha_3$ is zero. In this case, the transform component also outputs two values for $f_3$ that are each associated with one of the objects in the sample region. The frequency pair with a theoretical $f_3$ value closest to each of the actual $f_3$ values is considered a corresponding pair. LIDAR data can be generated for each of the corresponding pairs as described above and is considered and/or processed as the LIDAR data for a different one of the reflecting objects in the sample region. Each set of corresponding frequencies can be used in the above equations to generate LIDAR data. The generated LIDAR data will be for one of the objects in the sample region. As a result, multiple different LIDAR data values can be generated for a sample region where each of the different LIDAR data values corresponds to a different one of the objects in the sample region.

The LIDAR data results described in the context of FIG. 8A through FIG. 8C are generated by a single processing unit. Accordingly, the LIDAR data results described in the context of FIG. 8A through FIG. 8C are generated by processing units 34 from FIG. 1 or second processing component 40 from FIG. 1. However, as is evident from the above discussion, the LIDAR chip can include multiple processing units and different processing units receive comparative signals that include light that was in different polarization states after being reflected by an object located outside of the LIDAR system. For instance, when the LIDAR adapter is constructed as shown in FIG. 6E and FIG. 6F, the first processing component 34 receives a first LIDAR input signal that includes or consists of light that was in the TE polarization state after reflection by the object while the second processing component 40 receives a first LIDAR input signal that includes or consists of light that was in the TM polarization state after reflection by the object. As a result, the LIDAR results generated from the processing unit 34 is associated with a different polarization state than the LIDAR results generated from the second processing component 40.

The above configuration results in the LIDAR data for a single sample region in the field of view being generated from multiple different composite signals (i.e. first composite signals and the second composite signal) from the sample region. In some instances, determining the LIDAR data for the sample region includes the electronics combining the LIDAR data from different composite signals (i.e. the first composite signal and the second composite signal). Combining the LIDAR data can include taking an average, median, or mode of the LIDAR data generated from the different composite signals. For instance, the electronics can average the distances between the LIDAR system and the reflecting object determined from the first composite signal and the second composite signal and/or the electronics can average the radial velocities between the LIDAR system and the reflecting object determined from the first composite signal and the second composite signal.

In some instances, determining the LIDAR data for a sample region includes the electronics identifying one or more composite signals (i.e. the first composite signal and/or the second composite signal) as the source of the LIDAR data that is most represents reality (the representative LIDAR data). The electronics can then use the LIDAR data from the identified composite signal as the representative LIDAR data to be used for additional processing. For instance, the electronics can identify the signal (first composite signal or the second composite signal) with the larger amplitude as having the representative LIDAR data and can use the LIDAR data from the identified signal for further processing by the LIDAR system. In some instances, the electronics combine identifying the composite signal with the representative LIDAR data with combining LIDAR data from different LIDAR signals. For instance, the electronics can identify each of the composite signals with an amplitude above an amplitude threshold as having representative LIDAR data and when more than two composite signals are identified as having representative LIDAR data, the electronics can combine the LIDAR data from each of identified composite signals. When one composite signal is identified as having representative LIDAR data, the electronics can use the LIDAR data from that composite signal as the representative LIDAR data. When none of the composite signals is identified as having representative LIDAR data, the electronics can discard the LIDAR data for the sample region associated with those composite signals.

In addition or as an alternative to generating LIDAR data, the LIDAR system can be used to determine different characteristics of an object that reflects a LIDAR output signal because the relative proportion of TE and TM polarization states may be changed upon reflection, and the amount of change depends upon properties including material composition and surface quality. For instance, the signals associated with different polarization states can indicate material type, surface roughness, or the presence of surface coatings or contaminants. Accordingly, in some instances, the electronics can use ratios of one more signal features to identify material characteristics such as surface roughness, or the presence of surface coatings or contaminants. For instance, the electronics can compare the signal feature ratio to one or more criteria such as ratio thresholds. The electronics can determine or approximate a value for the material characteristic, a presence or absence of the material characteristic, and/or a presence or absence of the material in response to the result(s) of the comparison of the ratio to the one or more criteria. Examples of signal feature ratios include, but are not limited to, ratio of composite signal amplitudes for composite signals that include light from the same sample region but are associated with different polarization states, ratio of comparative signal amplitudes for comparative signals that include light from the same sample region but are associated with different polarization states, and the ratio of LIDAR input signal amplitudes for LIDAR input signals that include light from the same sample region but are associated with different polarization states.

Numeric labels such as first, second, third, etc. are used to distinguish different features and components and do not indicate sequence or existence of lower numbered features. For instance, a second component can exist without the presence of a first component and/or a third step can be performed before a first step.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A system, comprising:
   a LIDAR system configured to output multiple LIDAR output signals that each carries a different channel;
   the LIDAR system including a circulator that receives multiple output signals that each carries a different one of the channels and also receives light from multiple different LIDAR return signals that each carries light from a different one of the LIDAR output signals after the LIDAR output signal has been reflected by an object located outside of the LIDAR system,
   the circulator includes polarization rotators positioned between polarization splitters and light from each of the output signals travels through the polarization rotators and the polarization splitters,
   each of the LIDAR return signals includes light carried in multiple different polarization angles, and
   each of the LIDAR output signals including light from a different one of the output signals;
   the circulator configured to output multiple first LIDAR input signals that each carries a different one of the channels and multiple second LIDAR input signals that each carries a different one of the channels, the first LIDAR input signal and the second LIDAR input signal that carry the same channel having different distributions of the polarization angles.

2. The system of claim 1, wherein the first LIDAR input signals each carry light of a first polarization angle and substantially exclude light of a second polarization angle and the second LIDAR input signals carry light of the second polarization angle and substantially exclude light of the first polarization angle.

3. The system of claim 1, wherein the LIDAR output signals are each linearly polarized.

4. The system of claim 1, wherein the LIDAR output signals each includes light output from the circulator.

5. The system of claim 4, wherein the LIDAR output signals are output from the circulator and the LIDAR return signals are received by the circulator.

6. The system of claim 4, wherein the LIDAR output signals are spatially separated when output from the circulator.

7. The system of claim 6, wherein the LIDAR output signals each travels away from the LIDAR system in a different direction.

8. The system of claim 1, wherein one of the polarization rotators is a direction dependent polarization rotator and one of the polarization rotators is a direction independent polarization rotator.

9. The system of claim 1, wherein the LIDAR system includes a LIDAR chip with a Photonic Integrated Circuit.

10. A LIDAR system, comprising:
    a LIDAR assembly that includes a polarization component configured to receive a first light signal such that the first light signal travels an optical pathway from a first port of the polarization component to a second port of the polarization component, the polarization component configured to change a polarization angle of the first light signal as the first light signal travels along the optical pathway, the polarization angle of the first light signal being changed such that the first light signal enters the polarization component at the first port with a first polarization angle and exits the polarization component at the second port with a second polarization angle that is different from the first polarization angle;

the polarization component configured to receive a second light signal such that the second light signal travels the optical pathway from the second port to the first port, the polarization component configured to change a polarization angle of the second light signal as the second light signal travels along the optical pathway, the polarization angle of the second light signal being changed such that the second light signal enters the polarization component at the second port with the second polarization angle and exits the polarization component at the first port with the second polarization angle; and the LIDAR assembly being configured to output a LIDAR output signal that includes light from the first light signal and to receive a LIDAR return signal that includes light from the LIDAR output signal after the LIDAR output signal was reflected by an object located outside of the LIDAR assembly.

11. The system of claim 10, wherein the LIDAR output signal excludes light from second light signal.

12. The system of claim 10, wherein the polarization component is configured to receive a third light signal such that the third light signal travels a second optical pathway from a third port of the polarization component to a fourth port of the polarization component, the second optical pathway being different from the optical pathway, the polarization component configured to change a polarization angle of the third light signal as the third light signal travels along the second optical pathway, the polarization angle of the third light signal being changed such that the third light signal enters the polarization component at the third port with a third polarization angle and exits the polarization component at the fourth port with a fourth polarization angle that is different from the third polarization angle;

the polarization component configured to receive a fourth light signal such that the fourth light signal travels the second optical pathway from the fourth port to the third port, the polarization component configured to change a polarization angle of the fourth light signal as the fourth light signal travels along the second optical pathway, the polarization angle of the fourth light signal being changed such that the fourth light signal enters the polarization component at the fourth port with the fourth polarization angle and exits the polarization component at the third port with the fourth polarization angle.

13. The system of claim 10, wherein the fourth polarization angle is the same as the second polarization angle and the third polarization angle is the same as the first polarization angle.

14. The system of claim 10, wherein the polarization component includes a direction independent polarization rotator and a direction dependent polarization rotator arranged such that the optical pathway passes through the direction independent polarization rotator and the direction dependent polarization rotator.

15. The system of claim 10, wherein a LIDAR chip is a configured to output an output signal, the LIDAR chip including a Photonic Integrated Circuit (PIC), a LIDAR adapter configured to receive the output signal from the LIDAR chip, the LIDAR adapter including the polarization component, the polarization component including discrete optical components on a base.

16. The system of claim 15, wherein the first light signal includes light from the output signal.

17. The system of claim 12, wherein the second light signal includes light from the LIDAR return signal with the first polarization angle and substantially excludes light from the LIDAR return signal with the second polarization angle and the fourth light signal includes light from the LIDAR return signal with the second polarization angle and substantially excludes light from the LIDAR return signal with the first polarization angle.

18. The system of claim 17, wherein a LIDAR chip is a configured to output an output signal, the LIDAR chip including a Photonic Integrated Circuit (PIC), a LIDAR adapter is configured to receive the output signal from the LIDAR chip, the LIDAR adapter including the polarization component, the polarization component includes discrete optical components on a base, and the first light signal and the third light signal include light from the output signal.

19. The system of claim 17, wherein the LIDAR chip is configured to receive a first LIDAR input signal and a second LIDAR input signal from the LIDAR adapter, the first LIDAR input signal including light from the second light signal but not including light from the fourth light signal and the second LIDAR input signal including light from the fourth light signal but not including light the second light signal, and electronics configured to generate first LIDAR data from light included in the first LIDAR input signal and to generate first LIDAR data from light included in the first LIDAR input signal.

* * * * *